US009232237B2

(12) United States Patent
Sadafale et al.

(10) Patent No.: US 9,232,237 B2
(45) Date of Patent: Jan. 5, 2016

(54) BLOCK-BASED PARALLEL DEBLOCKING FILTER IN VIDEO CODING

(75) Inventors: Mangesh Devidas Sadafale, Bangalore (IN); Minhua Zhou, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 676 days.

(21) Appl. No.: 13/567,065

(22) Filed: Aug. 5, 2012

(65) Prior Publication Data

US 2013/0034169 A1  Feb. 7, 2013

Related U.S. Application Data

(60) Provisional application No. 61/546,175, filed on Oct. 12, 2011.

(30) Foreign Application Priority Data

Aug. 5, 2011 (IN) .......................... 2697/CHE/2011

(51) Int. Cl.
| H04N 7/26 | (2006.01) |
| H04N 19/86 | (2014.01) |
| H04N 19/176 | (2014.01) |
| H04N 19/117 | (2014.01) |

(Continued)

(52) U.S. Cl.
CPC ............. *H04N 19/86* (2014.11); *H04N 19/117* (2014.11); *H04N 19/157* (2014.11); *H04N 19/176* (2014.11); *H04N 19/436* (2014.11)

(58) Field of Classification Search
CPC . H04N 19/117; H04N 19/157; H04N 19/176; H04N 19/436; H04N 19/86
USPC .................................................... 375/240.24
See application file for complete search history.

(56) References Cited

U.S. PATENT DOCUMENTS

| 2005/0013494 A1* | 1/2005 | Srinivasan et al. ............. 382/233 |
| 2008/0123750 A1* | 5/2008 | Bronstein et al. ........ 375/240.24 |
| 2012/0093236 A1 | 4/2012 | Bjontegaard |

(Continued)

OTHER PUBLICATIONS

Ken McCann et al, "HM6: High Efficiency Video Coding (HEVC) Test Model 6 Encoder Description", JCTVC-H1002, Joint Collaborative Team on Video Coding (JCTVC) of ITU-T SG16 WP3 and ISO/IEC JTC1/SC29/WG11, pp. 1-53, Feb. 1-10, 2012, San Jose, CA.

(Continued)

*Primary Examiner* — Mohammed Rahaman
(74) *Attorney, Agent, or Firm* — Gregory J. Albin; Frank D. Cimino

(57) ABSTRACT

Deblocking filtering is provided in which an 8×8 filtering block covering eight sample vertical and horizontal boundary segments is divided into filtering sub-blocks that can be independently processed. To process the vertical boundary segment, the filtering block is divided into top and bottom 8×4 filtering sub-blocks, each covering a respective top and bottom half of the vertical boundary segment. To process the horizontal boundary segment, the filtering block is divided into left and right 4×8 filtering sub-blocks, each covering a respective left and right half of the horizontal boundary segment. The computation of the deviation d for a boundary segment in a filtering sub-block is performed using only samples from rows or columns in the filtering sub-block. Consequently, the filter on/off decisions and the weak/strong filtering decisions of the deblocking filtering are performed using samples contained within individual filtering blocks, thus allowing full parallel processing of the filtering blocks.

10 Claims, 12 Drawing Sheets

(51) Int. Cl.
  *H04N 19/157* (2014.01)
  *H04N 19/436* (2014.01)

(56) References Cited

U.S. PATENT DOCUMENTS

| | | | |
|---|---|---|---|
| 2012/0230423 A1* | 9/2012 | Esenlik et al. | 375/240.24 |
| 2012/0257702 A1* | 10/2012 | Narroschke et al. | 375/E07.027 |
| 2012/0287994 A1* | 11/2012 | Van der Auwera et al. | 375/240.12 |
| 2013/0266061 A1* | 10/2013 | An et al. | 375/240.02 |

OTHER PUBLICATIONS

Ken McCann et al, "HM5: High Efficiency Video Coding (HEVC) Test Model 5 Encoder Description", JCTVC-G1002, Joint Collaborative Team on Video Coding (JCTVC) of ITU-T SG16 WP3 and ISO/IEC JTC1/SC29/WG11, pp. 1-57, Nov. 21-30, 2011, Geneva, Switzerland.

Andrey Norkin, "On Parallel Deblocking", JCTVC-G616_r1, Joint Collaborative Team on Video Coding (JCTVC) of ITU-T SG16 WP3 and ISO/IEC JTC1/SC29/WG11, pp. 1-6, Nov. 21-30, 2011, Geneva, Switzerland.

Ken McCann et al, "HM4: High Efficiency Video Coding (HEVC) Test Model 4 Encoder Description", JCTVC-F802, Joint Collaborative Team on Video Coding (JCTVC) of ITU-T SG16 WP3 and ISO/IEC JTC1/SC29/WG11, pp. 1-36, Jul. 14-22, 2011, Torino, Italy.

Il-Koo Kim et al, "HM7: High Efficiency Video Coding (HEVC) Test Model 7 Encoder Description", JCTVC-I1002, Joint Collaborative Team on Video Coding (JCTVC) of ITU-T SG16 WP3 and ISO/IEC JTC1/SC29/WG11, pp. 1-50, Apr. 27-May 7, 2012, Geneva, Switzerland.

Gulistan Raja and Muhammad Javed Mirza, "In-loop Deblocking Filter for H.264/AVC Video", ISCCSP 2006, Proceeding Second International Symposium on Communications, Control and Signal Processing, pp. 1-5, Mar. 13-15, 2006, Marrakech, Morocco.

Minhua Zhou et al, "CE12 Subset 2: Test Results and Architectural Study on De-Blocking Without Parallel On/Off Filter Decision", JCTVC-G088, Joint Collaborative Team on Video Coding (JCTVC) of ITU-T SG16 WP3 and ISO/IEC JTC1/SC29/WG11, pp. 1-8, Nov. 19-30, 2011, Geneva, Switzerland.

Minhua Zhou et al, "CE12 Subset 2: Test Results and Architectural Study on De-Blocking Without Parallel On/Off Filter Decision", JCTVC-G088 presentation, Joint Collaborative Team on Video Coding (JCTVC) of ITU-T SG16 WP3 and ISO/IEC JTC1/SC29/WG11, pp. 1-21, Nov. 19-30, 2011, Geneva, Switzerland.

Benjamin Bross et al, "High Efficiency Video Coding (HEVC) Text Specification Draft 8", JCTVC-J1003_d7, Joint Collaborative Team on Video Coding (JCTVC) of ITU-T SG16 WP3 and ISO/IEC JTC1/SC29/WG11, pp. 1-260, Jul. 11-20, 2012, Stockholm, Sweden.

Mangesh Sadafale, "Improving Deblocking Filter Efficiency", JCTVC-F256, Joint Collaborative Team on Video Coding (JCTVC) of ITU-T SG16 WP3 and ISO/IEC JTC1/SC29/WG11, pp. 1-10, Jul. 14-22, 2011, Torino, Italy.

Mangesh Sadafale, "Improving Deblocking Filter Efficiency", JCTVC-256 presentation, Joint Collaborative Team on Video Coding (JCTVC) of ITU-T SG16 WP3 and ISO/IEC JTC1/SC29/WG11, pp. 1-14, Jul. 14-22, 2011, Torino, Italy.

Matthias Narroschke et al, "Reduction of Operations in the Critical Path of the Deblocking Filter", JCTVC-D214, Joint Collaborative Team on Video Coding (JCTVC) of ITU-T SG16 WP3 and ISO/IEC JTC1/SC29/WG11, pp. 1-15, Jan. 20-28, 2011, Daegu, Korea.

Matthias Narroschke et al, "Reduction of Operations in the Critical Path of the Deblocking Filter", JCTVC-D214 presentation, Joint Collaborative Team on Video Coding (JCTVC) of ITU-T SG16 WP3 and ISO/IEC JTC1/SC29/WG11, pp. 1-24, Jan. 20-28, 2011, Daegu, Korea.

Massaru Ikeda et al, "CE12 Subset2: Parallel Deblocking Filter", JCTVC-E181, Joint Collaborative Team on Video Coding (JCTVC) of ITU-T SG16 WP3 and ISO/IEC JTC1/SC29/WG11, pp. 1-11, Mar. 16-23, 2011, Geneva, Swizerland.

Massaru Ikeda et al, "JCTVC-E181 Parallel Deblocking Filter", JCTVC-E181 presentation, Joint Collaborative Team on Video Coding (JCTVC) of ITU-T SG16 WP3 and ISO/IEC JTC1/SC29/WG11, pp. 1-20, Mar. 16-23, 2011, Geneva, Swizerland.

Matthias Narroschke et al, "CE12 Subtest 1: Results for Modified Decisions for Deblocking", JCTVC-G590, Joint Collaborative Team on Video Coding (JCTVC) of ITU-T SG16 WP3 and ISO/IEC JTC1/SC29/WG11, pp. 1-6, Nov. 21-30, 2011, Geneva, Switzerland.

Matthias Narroschke et al, "CE12 Subtest 1: Results for Modified Decisions for Deblocking", JCTVC-G590 presentation, Joint Collaborative Team on Video Coding (JCTVC) of ITU-T SG16 WP3 and ISO/IEC JTC1/SC29/WG11, pp. 1-9, Nov. 21-30, 2011, Geneva, Switzerland.

Andrey Norkin, "Non-CE12: Cross-verification of Parallel Deblocking Proposal JCTVC-G089 from Tl by Ericsson", JCTVC-G624, Joint Collaborative Team on Video Coding (JCTVC) of ITU-T SG16 WP3 and ISO/IEC JTC1/SC29/WG11, pp. 1-2, Nov. 21-30, 2011, Geneva, Switzerland.

Jeyun Yu, "Parallel Deblocking Filter", JCTVC-G171, Joint Collaborative Team on Video Coding (JCTVC) of ITU-T SG16 WP3 and ISO/IEC JTC1/SC29/WG11, pp. 1-5, Nov. 21-30, 2011, Geneva, Switzerland.

Benjamin Bross et al, "WD5: Working Draft 5 of High-Efficiency Video Coding", JCTVC-G1103_d9, Joint Collaborative Team on Video Coding (JCTVC) of ITU-T SG16 WP3 and ISO/IEC JTC1/SC29/WG11, pp. 1-237, Nov. 21-30, 2011, Geneva, Switzerland.

Benjamin Bross et al, "WD4: Working Draft 4 of High-Efficiency Video Coding", JCTVC-F803_d6, Joint Collaborative Team on Video Coding (JCTVC) of ITU-T SG16 WP3 and ISO/IEC JTC1/SC29/WG11, pp. 1-229, Jul. 14-22, 2011, Torino, Italy.

Thomas Wiegand et al, "WD3: Working Draft 3 of High-Efficiency Video Coding", JCTVC-E603, Joint Collaborative Team on Video Coding (JCTVC) of ITU-T SG16 WP3 and ISO/IEC JTC1/SC29/WG11, pp. 1-215, Mar. 16-23, 2011, Geneva, Switzerland.

Benjamin Bross et al, "High Efficiency Video Coding (HEVC) Text Specification Draft 6", JCTVC-H1003, Joint Collaborative Team on Video Coding (JCTVC) of ITU-T SG16 WP3 and ISO/IEC JTC1/SC29/WG11, pp. 1-259, Nov. 21-30, 2011, Geneva, Switzerland.

Benjamin Bross et al, "High Efficiency Video Coding (HEVC) Text Specification Draft 7", JCTVC-I1003_d1, Joint Collaborative Team on Video Coding (JCTVC) of ITU-T SG16 WP3 and ISO/IEC JTC1/SC29/WG11, pp. 1-272, Apr. 27-May 7, 2012, Geneva, Switzerland.

"TMS320DM6467 Digital Media System-on-Chip", SPRS403G, Texas Instruments Incorporated, Dec. 2007, revised Oct. 2010, pp. 1-355.

* cited by examiner

VERTICAL
BOUNDARY

|   | $p3_0$ $p2_0$ $p1_0$ $p0_0$ | $q0_0$ $q1_0$ $q2_0$ $q3_0$ |   |
|---|---|---|---|
|   | $p3_1$ $p2_1$ $p1_1$ $p0_1$ | $q0_1$ $q1_1$ $q2_1$ $q3_1$ |   |
|   | $p3_2$ $\lceil p2_2$ $p1_2$ $p0_2\rceil$ | $\lceil q0_2$ $q1_2$ $q2_2\rceil$ $q3_2$ |   |
| A | $p3_3$ $p2_3$ $p1_3$ $p0_3$ | $q0_3$ $q1_3$ $q2_3$ $q3_3$ | B |
|   | $p3_4$ $p2_4$ $p1_4$ $p0_4$ | $q0_4$ $q1_4$ $q2_4$ $q3_4$ |   |
|   | $p3_5$ $\lfloor p2_5$ $p1_5$ $p0_5\rfloor$ | $\lfloor q0_5$ $q1_5$ $q2_5\rfloor$ $q3_5$ |   |
|   | $p3_6$ $p2_6$ $p1_6$ $p0_6$ | $q0_6$ $q1_6$ $q2_6$ $q3_6$ |   |
|   | $p3_7$ $p2_7$ $p1_7$ $p0_7$ | $q0_7$ $q1_7$ $q2_7$ $q3_7$ |   |

| $p3_0$ | $p3_1$ | $p3_2$ | $p3_3$ | $p3_4$ | $p3_5$ | $p3_6$ | $p3_7$ |
| $p2_0$ | $p2_1$ | $p2_2$ | $p2_3$ | $p2_4$ | $p2_5$ | $p2_6$ | $p2_7$ |
| $p1_0$ | $p1_1$ | $p1_2$ | $p1_3$ | $p1_4$ | $p1_5$ | $p1_6$ | $p1_7$ |
| $p0_0$ | $p0_1$ | $p0_2$ | $p0_3$ | $p0_4$ | $p0_5$ | $p0_6$ | $p0_7$ |

HORIZONTAL BOUNDARY

| $q0_0$ | $q0_1$ | $q0_2$ | $q0_3$ | $q0_4$ | $q0_5$ | $q0_6$ | $q0_7$ |
| $q1_0$ | $q1_1$ | $q1_2$ | $q1_3$ | $q1_4$ | $q1_5$ | $q1_6$ | $q1_7$ |
| $q2_0$ | $q2_1$ | $q2_2$ | $q2_3$ | $q2_4$ | $q2_5$ | $q2_6$ | $q2_7$ |
| $q3_0$ | $q3_1$ | $q3_2$ | $q3_3$ | $q3_4$ | $q3_5$ | $q3_6$ | $q3_7$ |

BLOCK-BASED PARALLEL DEBLOCKING FILTER IN VIDEO CODING

CROSS-REFERENCE TO RELATED APPLICATIONS

This application claims benefit of co-pending India Provisional Patent Application Ser. No. 2697/CHE/2011, filed Aug. 5, 2011, which is incorporated herein by reference in its entirety. This application claims benefit of U.S. Provisional Patent Application Ser. No. 61/546,175, filed Oct. 12, 2011, which is incorporated herein by reference in its entirety.

BACKGROUND OF THE INVENTION

1. Field of the Invention

Embodiments of the present invention generally relate to block-based parallel deblocking filtering in video coding.

2. Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and coding of the transform coefficients. While H.264/AVC divides a picture into fixed size macroblocks of 16×16 samples, HEVC divides a picture into largest coding units (LCUs), of 16×16, 32×32 or 64×64 samples. The LCUs may be further divided into smaller blocks, i.e., coding units (CU), using a quad-tree structure. A CU may be split further into prediction units (PUs) and transform units (TUs). The size of the transforms used in prediction error coding can vary from 4×4 to 32×32 samples, thus allowing larger transforms than in H.264/AVC, which uses 4×4 and 8×8 transforms. As the optimal size of the above mentioned blocks typically depends on the picture content, the reconstructed picture is composed of blocks of various sizes, each block being coded using an individual prediction mode and the prediction error transform.

In a coding scheme that uses block-based prediction and transform coding, discontinuities can occur in the reconstructed signal at block boundaries. Visible discontinuities at block boundaries are known as blocking artifacts. A major source of blocking artifacts is the block-transform coding of the prediction error followed by coarse quantization. Moreover, in the motion compensated prediction process, blocks from the previously coded pictures are used to form predictions for blocks in the current picture. Since predictions for adjacent blocks in the current picture might not come from adjacent blocks in the previously coded pictures, this process creates discontinuities at the block boundaries of the prediction signal. Similarly, when applying intra prediction, the prediction process of adjacent blocks might be different causing discontinuities at the block boundaries of the prediction signal. For example, one block is predicted from its neighboring block to the left and the adjacent block is predicted from its neighboring block above.

Two approaches to reduce blocking artifacts are post-filtering and in-loop filtering. Post-filtering is not specified by the video coding standard and can be performed, e.g., in the display process. In-loop filters operate within the encoding/decoding loop. Therefore, such filters need to be normative to avoid drift between the encoder and the decoder. There are three main in-loop filters defined by the emerging HEVC standard: a deblocking filter, a sample adaptive offset filter (SAO), and an adaptive loop filter (ALF). These filters may be applied sequentially, and, depending on the configuration, the SAO and ALF loop filters may be applied to the output of the deblocking filter.

The deblocking filter in HEVC is being designed with consideration of both subjective quality improvements and complexity reduction. The latter criterion was considered seriously since the deblocking filter of the H.264/AVC standard constitutes a significant part of the decoder complexity with up to one third of decoding time spent on deblocking filtering. These considerations have resulted in an evolving HEVC deblocking filter design that is less complex than the H.264/AVC deblocking filter while still having the capability to improve subjective and objective quality of a decoded picture.

SUMMARY

Embodiments of the present invention relate to methods, apparatus, and computer readable media for deblocking filtering. In one aspect, a method for deblocking filtering a reconstructed picture in a video encoder or a video decoder is provided that includes computing a first measure of deviation at a first four sample boundary segment covered by a first filtering sub-block of an 8×8 filtering block, wherein the first measure of deviation is computed using only samples of the reconstructed picture in the first filtering sub-block, using the first measure of deviation in deblocking filter decisions for the first boundary segment, computing a second measure of deviation at a second boundary segment covered by a second filtering sub-block of the 8×8 filtering block, wherein the second measure of deviation is computed using only samples of the reconstructed picture in the second filtering sub-block, and using the second measure of deviation in deblocking filter decisions for the second boundary segment, wherein the first filtering sub-block is a top 8×4 filtering sub-block, the second filtering sub-block is a bottom 8×4 filtering sub-block, and the first and second four sample boundary segments are vertical boundary segments, or the first filtering sub-block is a left 4×8 filtering sub-block, the second filtering sub-block is a right 4×8 filtering sub-block, and the first and second four sample boundary segments are horizontal boundary segments.

In one aspect, a digital system configured to perform deblocking filtering of a reconstructed picture is provided that includes means for computing a first measure of deviation at a first four sample boundary segment covered by a first filtering sub-block of an 8×8 filtering block, wherein the first measure of deviation is computed using only samples of the reconstructed picture in the first filtering sub-block, means for using the first measure of deviation in deblocking filter decisions for the first boundary segment, means for computing a second measure of deviation at a second boundary segment covered by a second filtering sub-block of the 8×8 filtering block, wherein the second measure of deviation is computed using only samples of the reconstructed picture in the second filtering sub-block, and means for using the second measure of deviation in deblocking filter decisions for the second boundary segment, wherein the first filtering sub-block is a top 8×4 filtering sub-block, the second filtering sub-block is a bottom 8×4 filtering sub-block, and the first and second four sample boundary segments are vertical boundary segments, or the first filtering sub-block is a left 4×8 filtering sub-block, the second filtering sub-block is a right 4×8 filtering sub-block, and the first and second four sample boundary segments are horizontal boundary segments.

In one aspect, a computer readable medium storing software instructions that when executed in a digital system cause the digital system to perform a method for deblocking filtering a reconstructed picture is provided. The method includes computing a first measure of deviation at a first four sample boundary segment covered by a first filtering sub-block of an 8×8 filtering block, wherein the first measure of deviation is computed using only samples of the reconstructed picture in the first filtering sub-block, using the first measure of deviation in deblocking filter decisions for the first boundary segment, computing a second measure of deviation at a second boundary segment covered by a second filtering sub-block of the 8×8 filtering block, wherein the second measure of deviation is computed using only samples of the reconstructed picture in the second filtering sub-block, and using the second measure of deviation in deblocking filter decisions for the second boundary segment, wherein the first filtering sub-block is a top 8×4 filtering sub-block, the second filtering sub-block is a bottom 8×4 filtering sub-block, and the first and second four sample boundary segments are vertical boundary segments, or the first filtering sub-block is a left 4×8 filtering sub-block, the second filtering sub-block is a right 4×8 filtering sub-block, and the first and second four sample boundary segments are horizontal boundary segments.

BRIEF DESCRIPTION OF THE DRAWINGS

Particular embodiments will now be described, by way of example only, and with reference to the accompanying drawings:

FIGS. 4 and 5 show samples used for computing sample deviation for, respectively, a vertical block boundary and a horizontal block boundary;

DETAILED DESCRIPTION OF EMBODIMENTS OF THE INVENTION

Figure 1:
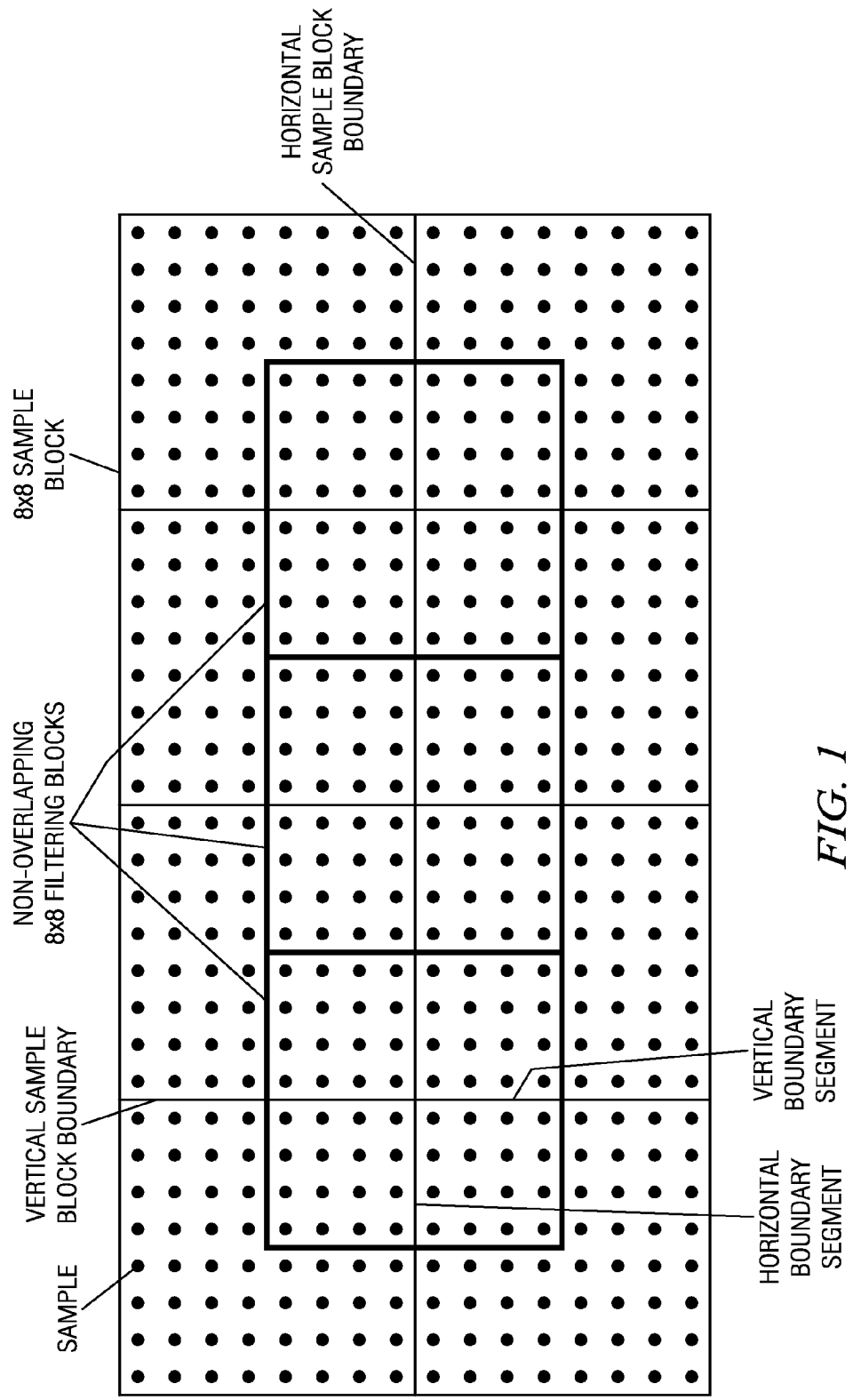
FIG. 1 is an example of picture samples divided into 8×8 blocks for purposes of deblocking.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC. In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be 4×4, 8×8, 16×16, and 32×32. The sizes of the transforms units and prediction units for a CU are determined by the video encoder during prediction based on minimization of rate/distortion costs.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), B. Bross, et al., "High Efficiency Video Coding (HEVC) Text Specification Draft 7," JCTVC-I1003_d0, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), and B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8").

Some aspects of this disclosure have been presented to the JCT-VC in M. Zhou et al., "Non-CE12: Enable Low-Complexity and Fully Parallelized De-Blocking Filter with Minor Changes," JCTVC-G089, Joint Collaborative Team on Video Coding (JCT-VC) of ITU-T SG16 WP3 and ISO/IEC JTC1/SC29/WG11, Geneva, CH, Nov. 19-30, 2011, which is incorporated by reference herein in its entirety.

As previously mentioned, independent coding of blocks may create discontinuities at block boundaries, e.g., PU and TU boundaries. Blocking artifacts can be easily perceived by the human visual system when the signal on both sides of the block boundary is relatively smooth, but are more difficult to notice when the signal shows high variation. Furthermore, if the original signal across the block boundary is subject to high variation, it is difficult to determine whether the changes in a reconstructed signal across the block boundary are caused by the block coding or were in the original signal.

In general, a deblocking filter has to decide whether or not to filter a particular TU or PU block boundary as well as the strength of the filtering to be applied. Excessive filtering may lead to unnecessary smoothing of picture details while not filtering at all may leave blocking artifacts that reduce the subjective quality of the picture. In HEVC, the deblocking filter operates on boundaries of 8×8 luma sample blocks in a picture. That is, for application of the deblocking filter, the luma samples of the reconstructed picture are divided into non-overlapping blocks of 8×8 samples, i.e., 8×8 sample blocks. An example is shown in FIG. 1. Further, the deblocking filter is applied to vertical boundaries before it is applied to horizontal boundaries. Thus, the samples used when processing vertical boundaries are the original reconstructed samples, and the samples used when processing horizontal boundaries may include both original reconstructed samples and intermediately de-blocked samples that were filtered when the deblocking filter processed vertical boundaries.

A strong or weak filter may be applied to a vertical boundary of an 8×8 sample block and/or a horizontal boundary of an 8×8 sample block to reduce blocking artifacts depending on criteria such as boundary strength, whether or not the sample block boundary corresponds to a boundary of a PU or TU, presence of non-zero transform coefficients in the sample block, prediction mode, sample values around the sample block boundary, etc. As is explained in more detail herein, in practice, for luma samples, the deblocking filter operates on non-overlapping 8×8 filtering blocks that are offset by four luma samples from the 8×8 sample blocks because an eight tap filter is used for deblocking, which requires four luma samples on each side of a boundary. An example of the 8×8 luma filtering blocks is shown in FIG. 1.

The detailed descriptions of deblocking filters and deblocking filtering methods are described herein for luma samples and luma blocks. As it is understood that luma samples and luma blocks are being processed, the word "luma" is mostly omitted in the descriptions below.

Figure 2:
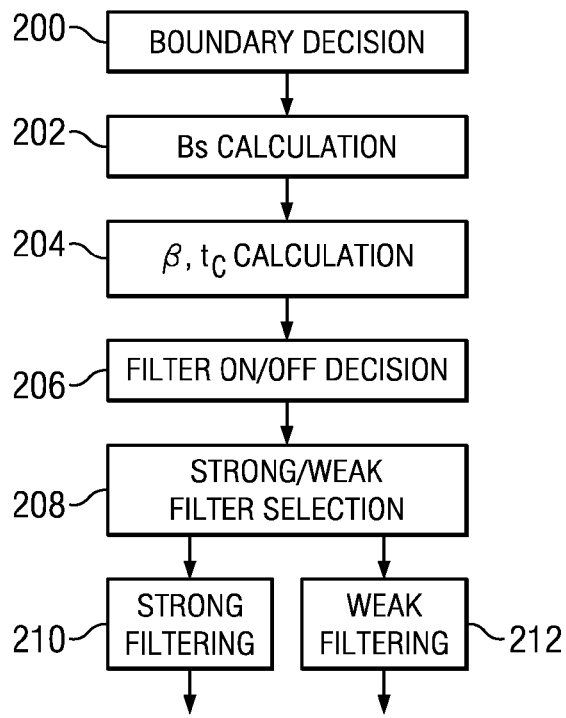
FIG. 2 is a flow diagram of the general high level flow of the deblocking filter.

FIG. 2 is a flow diagram illustrating the general high level flow of the HEVC deblocking filter for luma blocks. This flow is executed for both vertical boundaries and horizontal boundaries of the 8×8 sample blocks, with vertical boundaries processed before horizontal boundaries. In general, deblocking, i.e., application of a filter to reduce blocking artifacts, is performed on a sample block boundary when three criteria are true: the sample block boundary is a PU or TU boundary, the boundary strength is greater than zero, and there is a significant discontinuity at the boundary.

For a particular sample block boundary, a determination 200 is made as to whether the boundary is a TU boundary or a PU boundary. If the boundary is not a TU boundary or a PU boundary, then the boundary is not filtered. Otherwise, the boundary strength Bs of the boundary is computed 202. In general, the boundary strength Bs is an integer indicating how likely it is that a blocking artifact was created at this boundary during the coding process. The boundary strength Bs is determined based on criteria such as the coding mode (inter or intra), existence of non-zero transform coefficients, and existence of motion information, e.g., reference picture indices, number of motion vectors and motion vector difference, for sample blocks on each side of the boundary.

Two threshold values, $\beta$ and $t_C$, are also determined 204. As previously mentioned, a major source of blocking artifacts is the block transform coding of the prediction error followed by coarse quantization. Therefore, blocking artifact strength depends to a large extent on the values of the quantization parameters (QPs) used on the sample blocks at a boundary. Accordingly, these QP values are taken into account in the deblocking filter decisions through the use of these two thresholds. That is, the value of $\beta$ is derived based on the luma QPs of the sample blocks on each side of the boundary. The value of tc is derived based on both the computed boundary strength Bs and the luma QPs of the blocks on each side of the boundary.

The threshold $\beta$ controls the filter on/off decision. The value of the threshold $\beta$ is derived such that the value increases as the QP value increases, i.e., becomes coarser. Thus, deblocking will be enabled more frequently at high QP values as compared to low QP values because blocking artifacts are more likely at high QP values. The two threshold values may also used in the filter strength selection and in the actual filtering. For example, the value of $\beta$ may control how many samples at the block boundary are filtered if weak filtering is used. The value of $t_C$ (in combination with the boundary strength) may determine how much the sample values are modified for certain QP values for both weak and strong filtering operations. This helps to adaptively limit the amount or blurriness introduced by the filter application.

Figure 3:
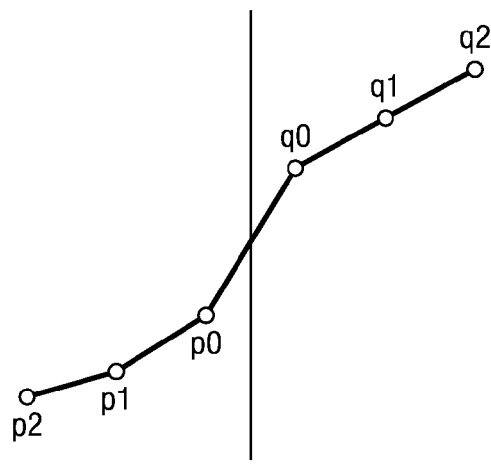
FIG. 3 is an example of a block boundary with a blocking artifact.

The filter on/off decision is then made 206, i.e., a determination is made as to whether or not to apply a deblocking filter to the boundary. In general, a blocking artifact is characterized by small spatial activity on both sides of a PU or TU block boundary where there is discontinuity at the block boundary. FIG. 3 shows a simple example of a PU or TU block boundary with a blocking artifact. To make the on/off decision, the deviation of the samples on both sides of the boundary from a straight line (a constant level signal or a ramp) is determined. If the determined deviation is less than the threshold $\beta$, then filtering is enabled; otherwise, no filtering is performed.

If the filtering is enabled, then the selection 208 of strong versus weak filtering is performed, and the selected filtering strength is applied 210, 212 at the boundary. The choice of filtering strength is made by evaluating samples on both sides of the boundary in relation to the thresholds to determine the amount of discontinuity, and thus the amount of filtering needed.

In the HEVC test model 4.0 (HM4.0) (and as described in WD4), a single deblocking filter on/off decision is made for a full eight row or eight column sample block boundary. That is, a measure of the deviation of the samples in rows or columns on each side of a boundary, d, is computed for an eight row or eight column boundary. Further, the strong/weak filter decision is made based on sample values each side of the boundary from each of the eight rows or columns and is made separately for each row or column.

More specifically, for the filter on/off decision, the decision for a vertical boundary or a horizontal boundary between sample blocks is computed as $$\begin{cases} d_2 = |p2_2 - 2 \cdot p1_2 + p0_2| + |q2_2 - 2 \cdot q1_2 + q0_2| \\ d_5 = |p2_5 - 2 \cdot p1_5 + p0_5| + |q2_5 - 2 \cdot q1_5 + q0_5| \\ \quad d = d_2 + d_5 < \beta \end{cases} \quad (1)$$

where $p2_2, p1_2, p0_2, q2_2, q1_2, q0_2, p2_5, p1_5, p0_5, q2_5, q1_5$, and $q0_5$ are sample values as shown in dotted rectangles in FIG. 4

(for a vertical boundary) and FIG. 5 (for a horizontal boundary). The sample row and column indices are relative to the sample block from which the samples are taken. Note that the measure of the deviation, d, is computed as the absolute sample gradient along the particular boundary. The de-blocking filtering is turned on for a vertical boundary or a horizontal boundary when the condition specified in Eq.1 is true; otherwise, the de-blocking filtering is off. Because vertical boundaries are processed by the deblocking filter before horizontal boundaries, the samples of FIG. 4 are original reconstructed samples and the samples of FIG. 5 may be a combination of original reconstructed samples and intermediately de-blocked samples that were filtered when the deblocking filter processed a vertical boundary.

Figure 6:
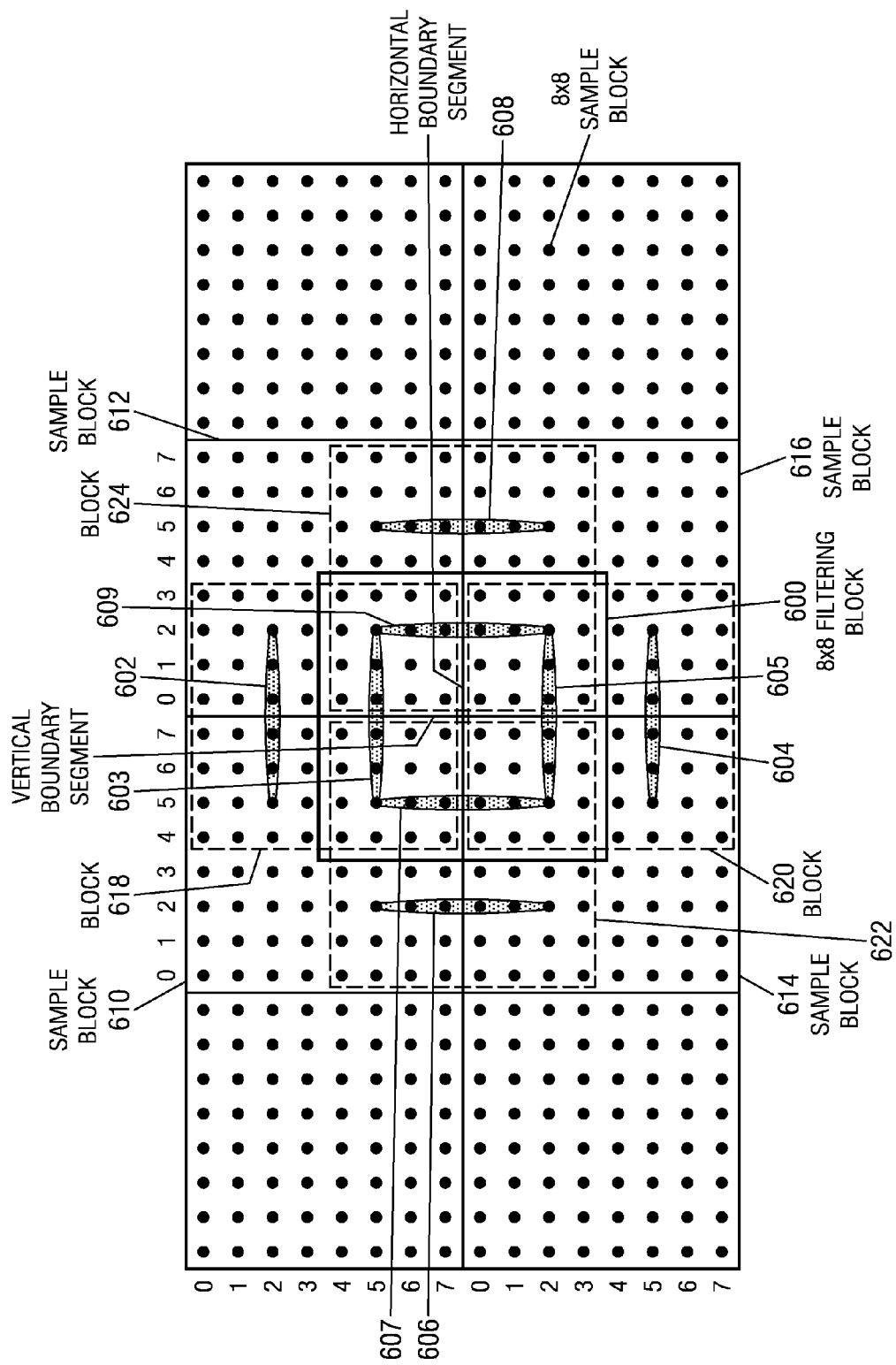
FIG. 6 is an example illustrating the dependency between neighboring blocks for computation of sample deviation.

For example, the 8×8 block of samples of FIG. 4 corresponds to block 618 of FIG. 6 for the vertical boundary between sample blocks 610 and 612 and samples 602 and 603 correspond to the dotted rectangles in FIG. 4. Similarly, the 8×8 block of samples of FIG. 4 corresponds to block 620 of FIG. 6 for the vertical boundary between sample blocks 614 and 616 and samples 604 and 605 correspond to the dotted rectangles in FIG. 4. Further, the 8×8 block of samples of FIG. 5 corresponds to block 622 of FIG. 6 for the horizontal boundary between sample blocks 610 and 614 and samples 606 and 607 correspond to the dotted rectangles in FIG. 5. Similarly, the 8×8 block of samples of FIG. 5 corresponds to block 624 of FIG. 6 for the horizontal boundary between sample blocks 612 and 616 and samples 608 and 609 correspond to the dotted rectangles in FIG. 5.

If filtering is turned on, a strong/weak filter decision is computed for each of the eight rows of a vertical boundary or the eight columns of a horizontal boundary. The decision for a row or column is based on the following three conditions:

$$d < \beta/4$$

$$|p3_i - p0_i| + |q0_i - q3_i| < \beta/8$$

$$|p0_i - q0_i| < (5t_C + 1)/2 \qquad (2)$$

where i=0 . . . 7 and d=$d_2$+$d_5$. If all three conditions are true, strong filtering is selected for the row or column; otherwise, weak filtering is selected. Note that the second condition uses two samples and the third condition uses one sample on each side of the vertical boundary in each of the eight rows as shown in FIG. 4 and on each side of the horizontal boundary in each of the eight columns as shown in FIG. 5. As can be seen from these three conditions, the strong/weak filter decision depends on the absolute sample gradient along the particular boundary and the absolute sample gradient across the particular boundary.

As was previously mentioned, in practice, the deblocking filter is applied in offset 8×8 filtering blocks rather than to the 8×8 sample blocks, so that horizontal boundaries can be processed immediately after vertical boundaries in block-based processing. Block 600 of FIG. 6 is an example of an 8×8 filtering block. Note that a filtering block covers an eight sample vertical boundary segment and an eight sample horizontal boundary segment. Each boundary segment includes a four sample boundary segment from each of two neighboring sample blocks. For example, in FIG. 6, the vertical boundary segment of filtering block 600 includes a segment of the vertical boundary between sample blocks 610 and 612 and a segment of the vertical boundary between sample blocks 614 and 616. Also, the horizontal boundary segment of filtering block 600 includes a segment of the horizontal boundary between sample blocks 610 and 614 and a segment of the horizontal boundary between sample blocks 612 and 616.

Because the eight sample vertical and horizontal boundary segments in a filtering block include four sample segments of the vertical or horizontal boundaries between two pairs of neighboring sample blocks, the on/off filter decision computation for each four sample segment and the strong/weak filter decision computations are made separately for each four sample boundary segment. However, the computation of the deviation d for each four sample boundary segment is made according to the full eight sample boundary of which the boundary segment is a part.

For example, the top four sample vertical boundary segment of the eight sample vertical boundary segment of filtering block 600 in FIG. 6 is part of the vertical boundary between sample blocks 610 and 612. The deviation d for this four sample vertical boundary segment is computed as per Eq. 1 above using samples 602 and 603. Similarly, the left four sample horizontal boundary segment of the horizontal boundary segment of filtering block 600 is part of the horizontal boundary between sample blocks 610 and 614. The deviation d for this four sample horizontal boundary segment is computed as per Eq. 1 above using samples 606 and 607.

Accordingly, there is a dependency between the 8×8 filtering blocks which complicates full parallel processing of the filtering blocks. That is, rows and columns of samples from neighboring filtering blocks are needed for computation of the deviation d for each of the four sample boundary segments. For example, for the filtering block 600, two rows of samples 602, 604 and two columns of samples 606, 608 are needed from neighboring filtering blocks to compute the deviation d.

Embodiments of the invention provide for computation of the deviation d for a four sample boundary segment of an eight sample boundary segment in an 8×8 filtering block using samples within the filtering block. In effect, an 8×8 filtering block is divided into filtering sub-blocks that can be independently processed. For processing the eight sample vertical boundary segment, the 8×8 filtering block is divided into two 8×4 filtering sub-blocks, one of which covers the top half of the eight sample vertical boundary segment and the other of which covers the bottom half of the eight sample vertical boundary segment. For processing the eight sample horizontal boundary segment, the 8×8 filtering block is divided into two 4×8 filtering sub-blocks, one of which covers the left half of the eight sample horizontal boundary segment and the other of which covers the right half of the eight sample horizontal boundary segment. The computation of the deviation d for a four sample boundary segment in a filtering sub-block is performed using samples from rows or columns in the filtering sub-block. Consequently, for each filtering block, the filter on/off decisions and the weak/strong filtering decisions are performed using samples contained within the filtering block, thus allowing full parallel processing of the filtering blocks.

Figure 7:
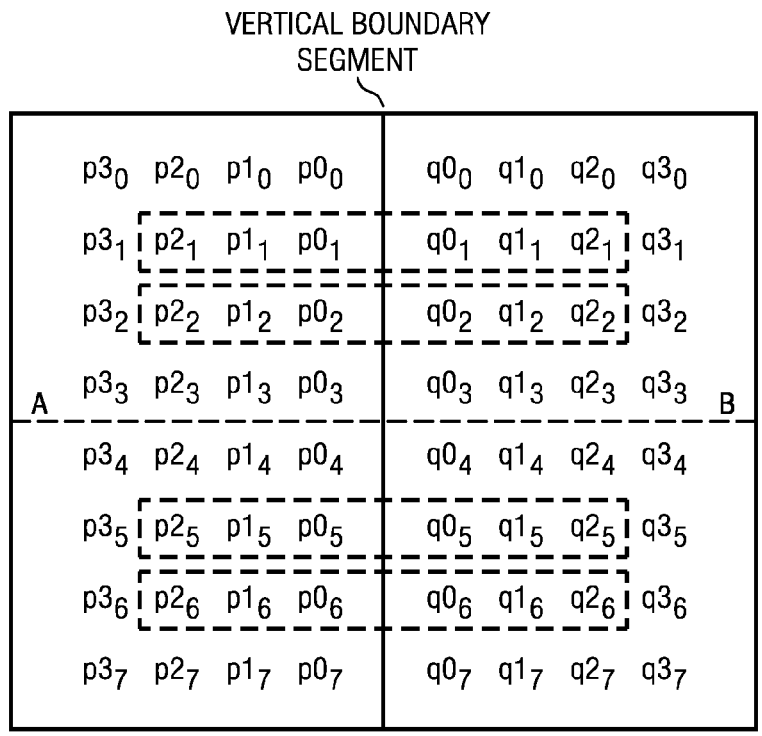
FIGS. 7 and 8 show samples used for computing sample deviation for, respectively, a vertical block boundary and a horizontal block boundary.
Figure 8:
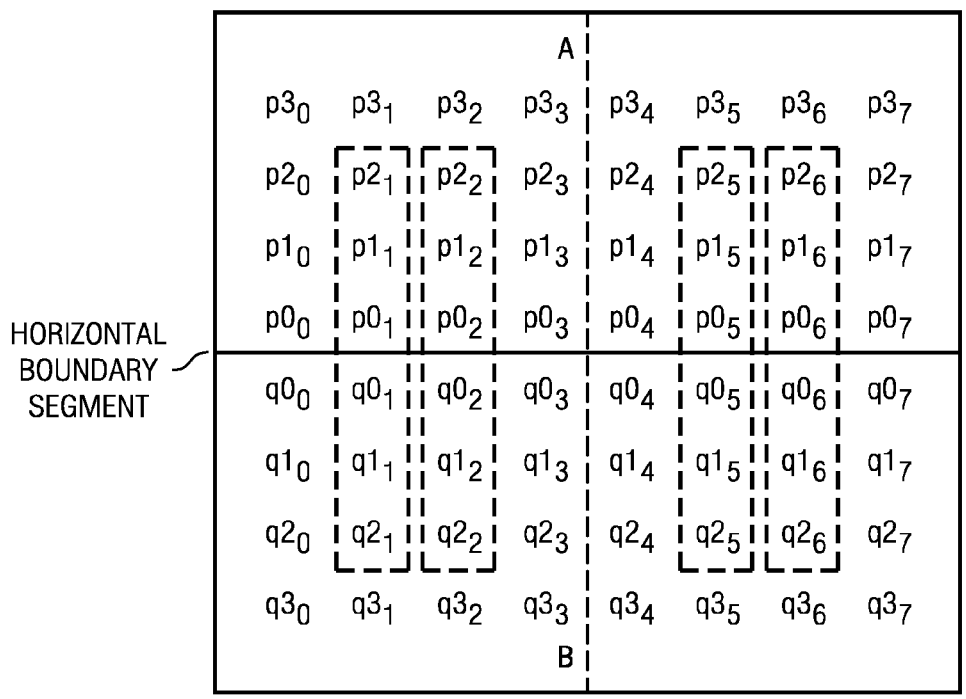

More specifically, in embodiments of the invention, similar to the two row or two column computation of the deviation d as per Eq. 1, the samples in two rows or columns in a filtering sub-block may be used to compute the deviation d. Any suitable combination of two rows or columns from a filtering sub-block may be used. For example, in some embodiments, the filter on/off decision for a four sample vertical boundary segment in a top filtering sub-block or for a four sample horizontal boundary segment in a left filtering sub-block (and hence the deviation d) is computed using samples from the middle two rows or columns of the filtering sub-block as per $$\begin{cases} d_5 = |p2_5 - 2 \cdot p1_5 + p0_5| + |q2_5 - 2 \cdot q1_5 + q0_5| \\ d_6 = |p2_6 - 2 \cdot p1_6 + p0_6| + |q2_6 - 2 \cdot q1_6 + q0_6| \\ d = d_5 + d_6 < \beta \end{cases} \quad (3)$$

where $p2_5, p1_5, p0_5, q2_5, q1_5, q0_5, p2_6, p1_6, p0_6, q2_6, q1_6$, and $q0_6$ are sample values as shown in dotted rectangles in FIG. 7 (for a vertical boundary segment) and FIG. 8 (for a horizontal boundary segment). Similarly, the filter on/off decision for a four sample vertical boundary segment in a bottom filtering sub-block or for a four sample horizontal boundary segment in a right filtering sub-block (and hence the deviation d) is computed using samples from the middle two rows or columns of the filtering sub-block as per $$\begin{cases} d_1 = |p2_1 - 2 \cdot p1_1 + p0_1| + |q2_1 - 2 \cdot q1_1 + q0_1| \\ d_2 = |p2_2 - 2 \cdot p1_2 + p0_2| + |q2_2 - 2 \cdot q1_2 + q0_5| \\ d = d_1 + d_2 < \beta \end{cases} \quad (4)$$

where $p2_1, p1_1, p0_1, q2_1, q1_1, q0_1, p2_2, p1_2, p0_2, q2_2, q1_2$, and $q0_2$ are sample values as shown in dotted rectangles in FIG. 7 (for a vertical boundary segment) and FIG. 8 (for a horizontal boundary segment). The sample row and column indices are relative to the sample block from which the samples are taken. Because vertical boundaries are processed by the deblocking filter before horizontal values, the samples of FIG. 7 are original reconstructed samples and the samples of FIG. 8 may be a combination of original reconstructed samples and intermediately de-blocked samples that were filtered when the deblocking filter processed a vertical boundary.

Figure 9:
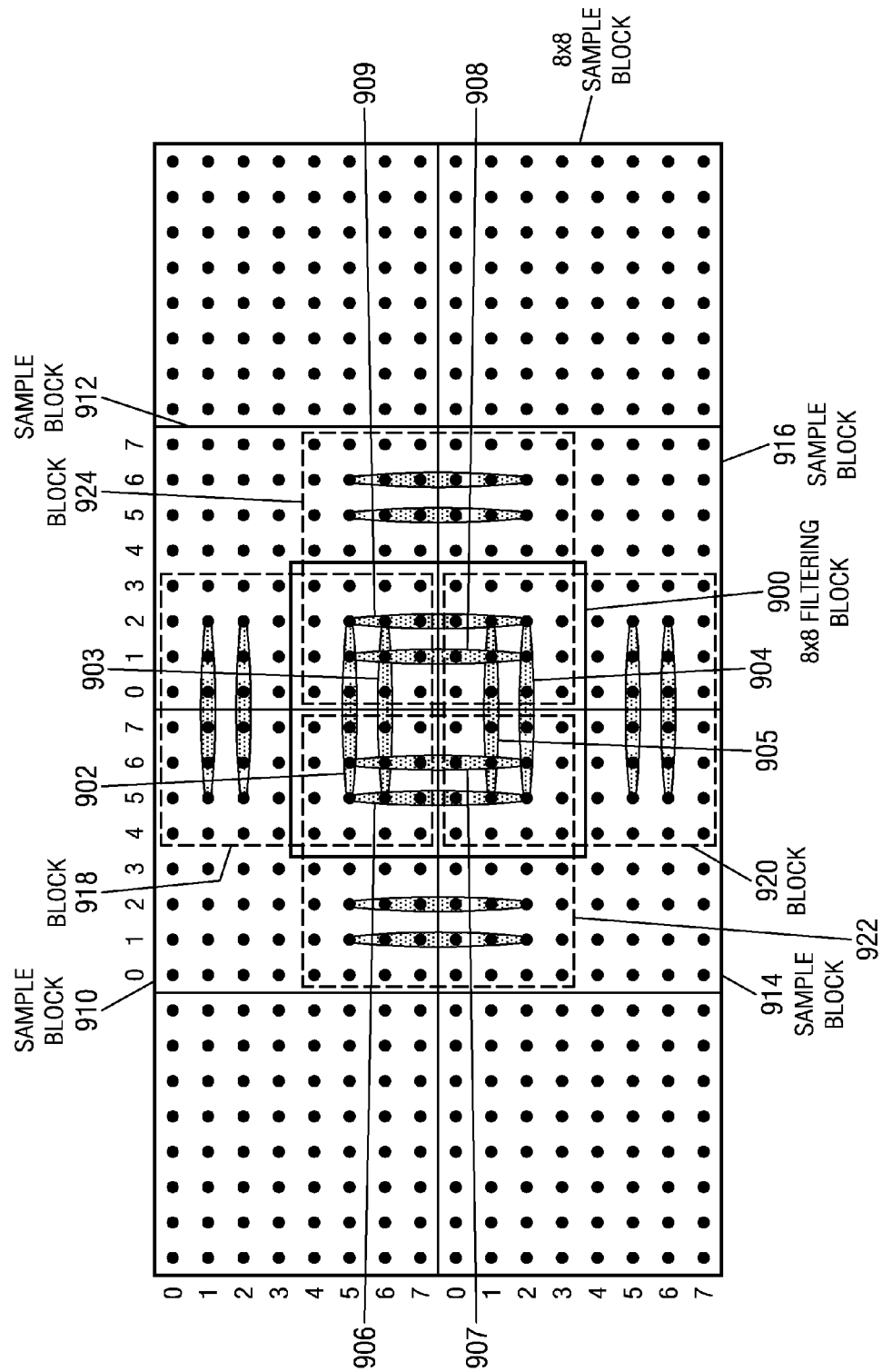
FIG. 9 is an example illustrating that there is no dependency between neighboring blocks for computation of sample deviation.

For example, the 8×8 block of samples of FIG. 7 corresponds to block 918 of FIG. 9 for the vertical boundary between sample blocks 910 and 912 and samples 902 and 903 correspond to the dotted rectangles in the bottom 8×4 portion of the block in FIG. 7. Similarly, the 8×8 block of samples of FIG. 7 corresponds to block 920 of FIG. 9 for the vertical boundary between sample blocks 914 and 916 and samples 904 and 905 correspond to the dotted rectangles in the top 8×4 portion of the block in FIG. 7. Further, the 8×8 block of samples of FIG. 8 corresponds to block 922 of FIG. 9 for the horizontal boundary between sample blocks 910 and 914 and samples 906 and 907 correspond to the dotted rectangles in the right 4×8 portion of the block in FIG. 8. Similarly, the 8×8 block of samples of FIG. 8 corresponds to block 924 of FIG. 9 for the horizontal boundary between sample blocks 912 and 916 and samples 908 and 909 correspond to the dotted rectangles in the left 4×8 portion of the block in FIG. 8.

Figure 10:
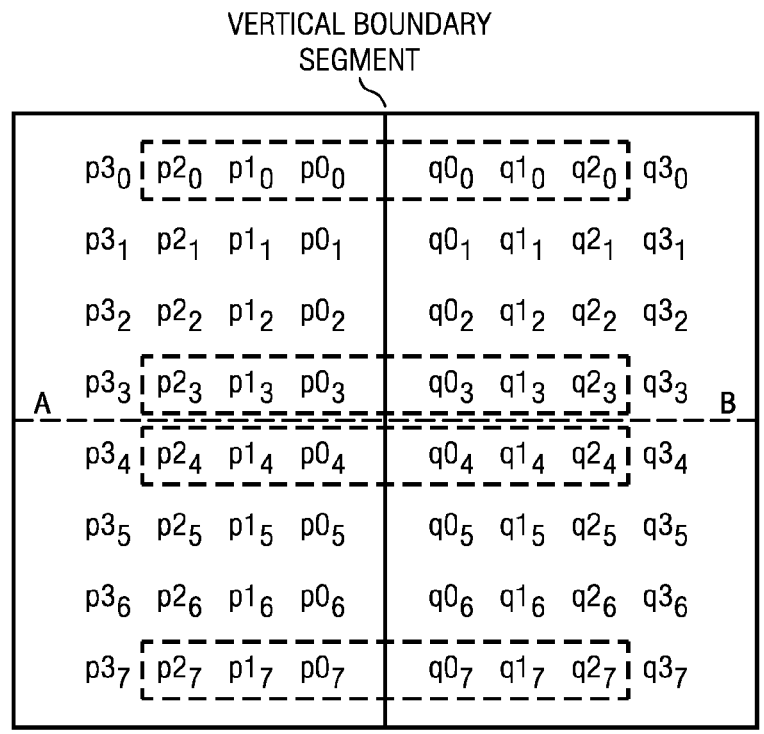
FIGS. 10 and 11 show samples used for computing sample deviation for, respectively, a vertical block boundary and a horizontal block boundary.
Figure 11:
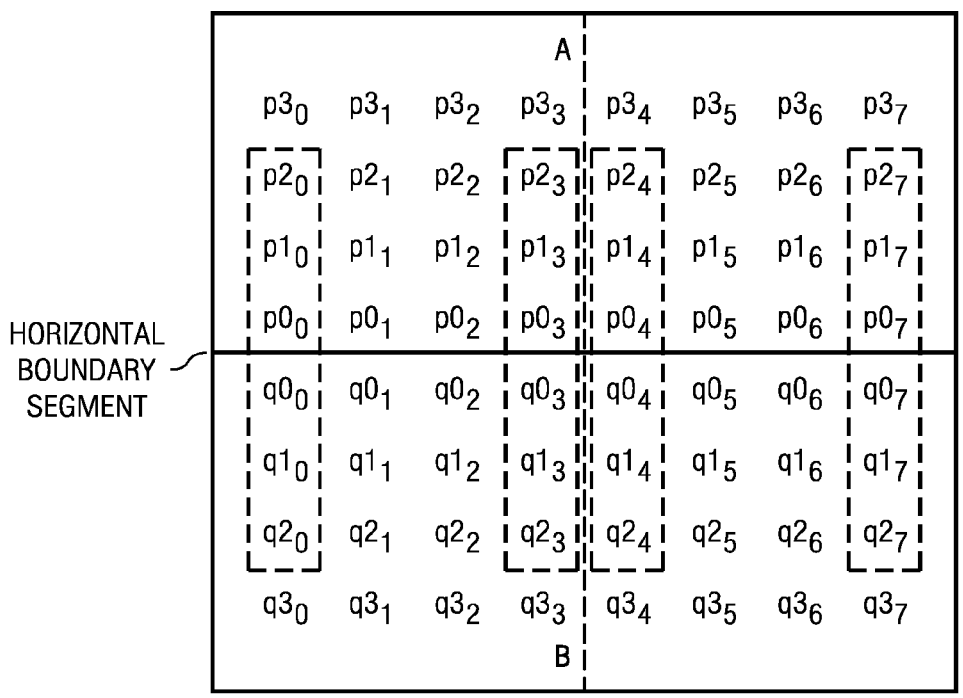

In another example, in some embodiments, the filter on/off decision for a four sample vertical boundary segment in a top filtering sub-block or for a four sample horizontal boundary segment in a left filtering sub-block (and hence the deviation d) is computed using samples from the outer two rows or columns of the filtering sub-block as per $$\begin{cases} d_4 = |p2_4 - 2 \cdot p1_4 + p0_4| + |q2_4 - 2 \cdot q1_4 + q0_4| \\ d_7 = |p2_7 - 2 \cdot p1_7 + p0_7| + |q2_7 - 2 \cdot q1_7 + q0_7| \\ d = d_4 + d_7 < \beta \end{cases} \quad (5)$$

where $p2_4, p1_4, p0_4, q2_4, q1_4, q0_4, p2_7, p1_7, p0_7, q2_7, q1_7$, and $q0_7$ are sample values as shown in dotted rectangles in FIG. 10 (for a vertical boundary segment) and FIG. 11 (for a horizontal boundary segment). Similarly, the filter on/off decision for a four sample vertical boundary segment in a bottom filtering sub-block or for a four sample horizontal boundary segment in a right filtering sub-block (and hence the deviation d) is computed using samples from the outer two rows or columns of the filtering sub-block as per $$\begin{cases} d_0 = |p2_0 - 2 \cdot p1_0 + p0_0| + |q2_0 - 2 \cdot q1_0 + q0_0| \\ d_3 = |p2_3 - 2 \cdot p1_3 + p0_3| + |q2_3 - 2 \cdot q1_3 + q0_3| \\ d = d_0 + d_3 < \beta \end{cases} \quad (6)$$

where $p2_0, p1_0, p0_0, q2_0, q1_0, q0_0, p2_3, p1_3, p0_3, q2_3, q1_3$, and $q0_3$ are sample values as shown in dotted rectangles in FIG. 10 (for a vertical boundary segment) and FIG. 11 (for a horizontal boundary segment). Because vertical boundaries are processed by the deblocking filter before horizontal values, the samples of FIG. 10 are original reconstructed samples and the samples of FIG. 11 may be a combination of original reconstructed samples and intermediately de-blocked samples that were filtered when the deblocking filter processed a vertical boundary.

Figure 12:
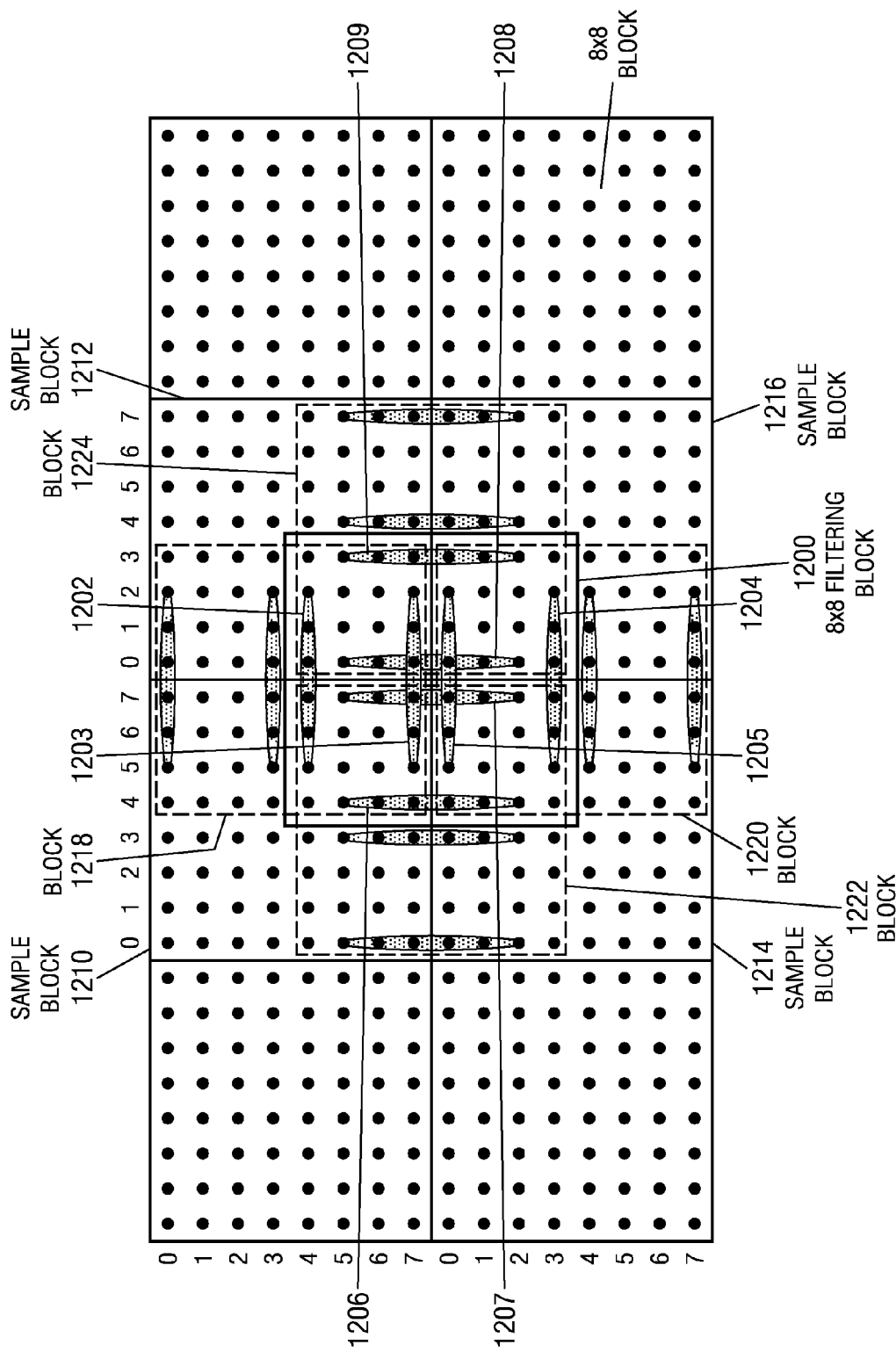
FIG. 12 is an example illustrating that there is no dependency between neighboring blocks for computation of sample deviation.

For example, the 8×8 block of samples of FIG. 10 corresponds to block 1218 of FIG. 12 for the vertical boundary between sample blocks 1210 and 1212 and samples 1202 and 1203 correspond to the dotted rectangles in the bottom 8×4 portion of the block in FIG. 10. Similarly, the 8×8 block of samples of FIG. 10 corresponds to block 1220 of FIG. 12 for the vertical boundary between sample blocks 1214 and 1216 and samples 1204 and 1205 correspond to the dotted rectangles in the top 8×4 portion of the block in FIG. 10. Further, the 8×8 block of samples of FIG. 11 corresponds to block 1222 of FIG. 12 for the horizontal boundary between sample blocks 1210 and 1214 and samples 1206 and 1207 correspond to the dotted rectangles in the right 4×8 portion of the block in FIG. 11. Similarly, the 8×8 block of samples of FIG. 11 corresponds to block 1224 of FIG. 12 for the horizontal boundary between sample blocks 1212 and 1216 and samples 1208 and 1209 correspond to the dotted rectangles in the left 4×8 portion of the block in FIG. 11.

In some embodiments, for the strong/weak filter decision, the samples from any suitable combination of rows and columns may be used. For example, in some embodiments, similar to eight row or column filter strength selection, a strong/weak filter decision is computed for each of the four rows of a vertical boundary segment or the four columns of a horizontal boundary segment. The decision for a row or column is based on the following three conditions:

$$d < \beta/4$$

$$|p3_i - p0_i| + |q0_i - q3_i| < \beta/8$$

$$|p0_i - q0_i| < (5t_C + 1)/2 \quad (7)$$

where i=0 . . . 3 for a bottom filtering sub-block or a right filtering sub-block, i=4 . . . 7 for a top filtering sub-block or a left filtering sub-block, and d is the deviation computed for the respective filtering sub-block. If all three conditions are true, strong filtering is selected for the row or column; otherwise, weak filtering is selected.

In another example, in some embodiments, rather than making a separate strong/weak filter decision for each row or column, the decision is made jointly for the four rows or columns of a filtering sub-block. For example, if the outer two rows or columns of a filtering sub-block are used for the filter on/off decision, then the same outer two rows or columns are also used for the joint strong/weak filter decision. Similarly, if the inner two rows or columns of a filtering sub-block are used for the filter on/off decision, then the same inner two rows or columns are also used for the joint strong/weak filter decision.

For example, if the outer two rows or columns are used for the on/off filter decision, the joint strong/weak filter decision for the four rows of a bottom filtering sub-block or the four columns of a right filtering sub-block is based on the following six conditions:

$$2d_0 < \beta/4$$

$$|p3_0-p0_0|+|q0_0-q3_0| < \beta/8$$

$$|p0_0-q0_0| < (5t_C+1)/2$$

$$2d_3 < \beta/4$$

$$|p3_3-p0_3|+|q0_3-q3_3| < \beta/8$$

$$|p0_3-q0_3| < (5t_C+1)/2 \qquad (8)$$

If all six conditions are true, strong filtering is selected for all four rows or columns; otherwise, weak filtering is selected.

Similarly, the strong/weak filter decision for the four rows of a top filtering sub-block or the four columns of a left filtering sub-block is based on the following six conditions:

$$2d_4 < \beta/4$$

$$|p3_4-p0_4|+|q0_4-q3_4| < \beta/8$$

$$|p0_4-q0_4| < (5t_C+1)/2$$

$$2d_7 < \beta/4$$

$$|p3_7-p0_7|+|q0_7-q3_7| < \beta/8$$

$$|p0_7-q0_7| < (5t_C+1)/2 \qquad (9)$$

If all six conditions are true, strong filtering is selected for all four rows or columns; otherwise, weak filtering is selected. Adaptation of Eq. 8 and Eq. 9 for other row or column pairs, e.g., the inner two rows or columns, will be understood by one of ordinary skill in the art.

In embodiments of the invention, all samples used for on/off filter decisions and strong/weak filter selection are located inside the 8×8 filtering segment being processed. See the examples of FIGS. 9 and 12. Because there is no dependency across 8×8 filtering segments, the deblocking filter process for these blocks may be fully parallelized. Further, architecture flexibility and simplicity is improved over the HM4.0 approach in that the same filtering logic can be replicated to process multiple 8×8 filtering segments in parallel if high throughput is desired or 8×8 filtering segment may be processed serially if throughput is not a concern.

Figure 13:
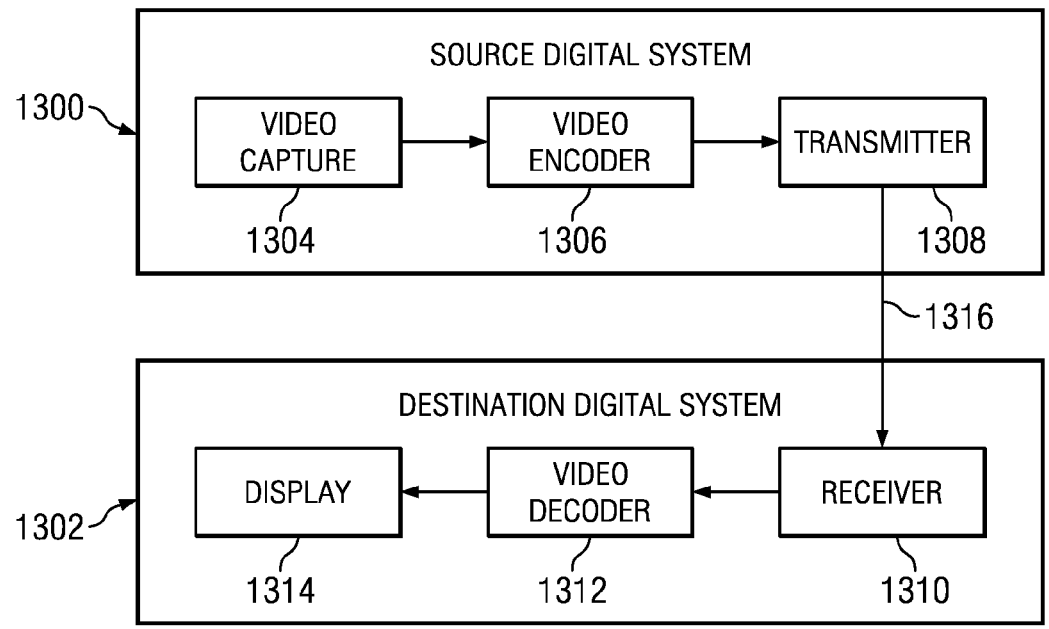
FIG. 13 is a block diagram of a digital system.

FIG. 13 shows a block diagram of a digital system that includes a source digital system 1300 that transmits encoded video sequences to a destination digital system 1302 via a communication channel 1316. The source digital system 1300 includes a video capture component 1304, a video encoder component 1306, and a transmitter component 1308. The video capture component 1304 is configured to provide a video sequence to be encoded by the video encoder component 1306. The video capture component 1304 may be, for example, a video camera, a video archive, or a video feed from a video content provider. In some embodiments, the video capture component 1304 may generate computer graphics as the video sequence, or a combination of live video, archived video, and/or computer-generated video.

The video encoder component 1306 receives a video sequence from the video capture component 1304 and encodes it for transmission by the transmitter component 1308. The video encoder component 1306 receives the video sequence from the video capture component 1304 as a sequence of pictures, divides the pictures into largest coding units (LCUs), and encodes the video data in the LCUs. The video encoder component 1306 may be configured to perform a method for deblocking filtering during the encoding process as described herein. An embodiment of the video encoder component 1306 is described in more detail herein in reference to FIG. 14.

The transmitter component 1308 transmits the encoded video data to the destination digital system 1302 via the communication channel 1316. The communication channel 1316 may be any communication medium, or combination of communication media suitable for transmission of the encoded video sequence, such as, for example, wired or wireless communication media, a local area network, or a wide area network.

The destination digital system 1302 includes a receiver component 1310, a video decoder component 1312 and a display component 1314. The receiver component 1310 receives the encoded video data from the source digital system 1300 via the communication channel 1316 and provides the encoded video data to the video decoder component 1312 for decoding. The video decoder component 1312 reverses the encoding process performed by the video encoder component 1306 to reconstruct the LCUs of the video sequence. The video decoder component 1312 may be configured to a method for deblocking filtering during the decoding process as described herein. An embodiment of the video decoder component 1312 is described in more detail below in reference to FIG. 15.

The reconstructed video sequence is displayed on the display component 1314. The display component 1314 may be any suitable display device such as, for example, a plasma display, a liquid crystal display (LCD), a light emitting diode (LED) display, etc.

In some embodiments, the source digital system 1300 may also include a receiver component and a video decoder component and/or the destination digital system 1302 may include a transmitter component and a video encoder component for transmission of video sequences both directions for video steaming, video broadcasting, and video telephony. Further, the video encoder component 1306 and the video decoder component 1312 may perform encoding and decoding in accordance with one or more video compression standards. The video encoder component 1306 and the video decoder component 1312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 14:
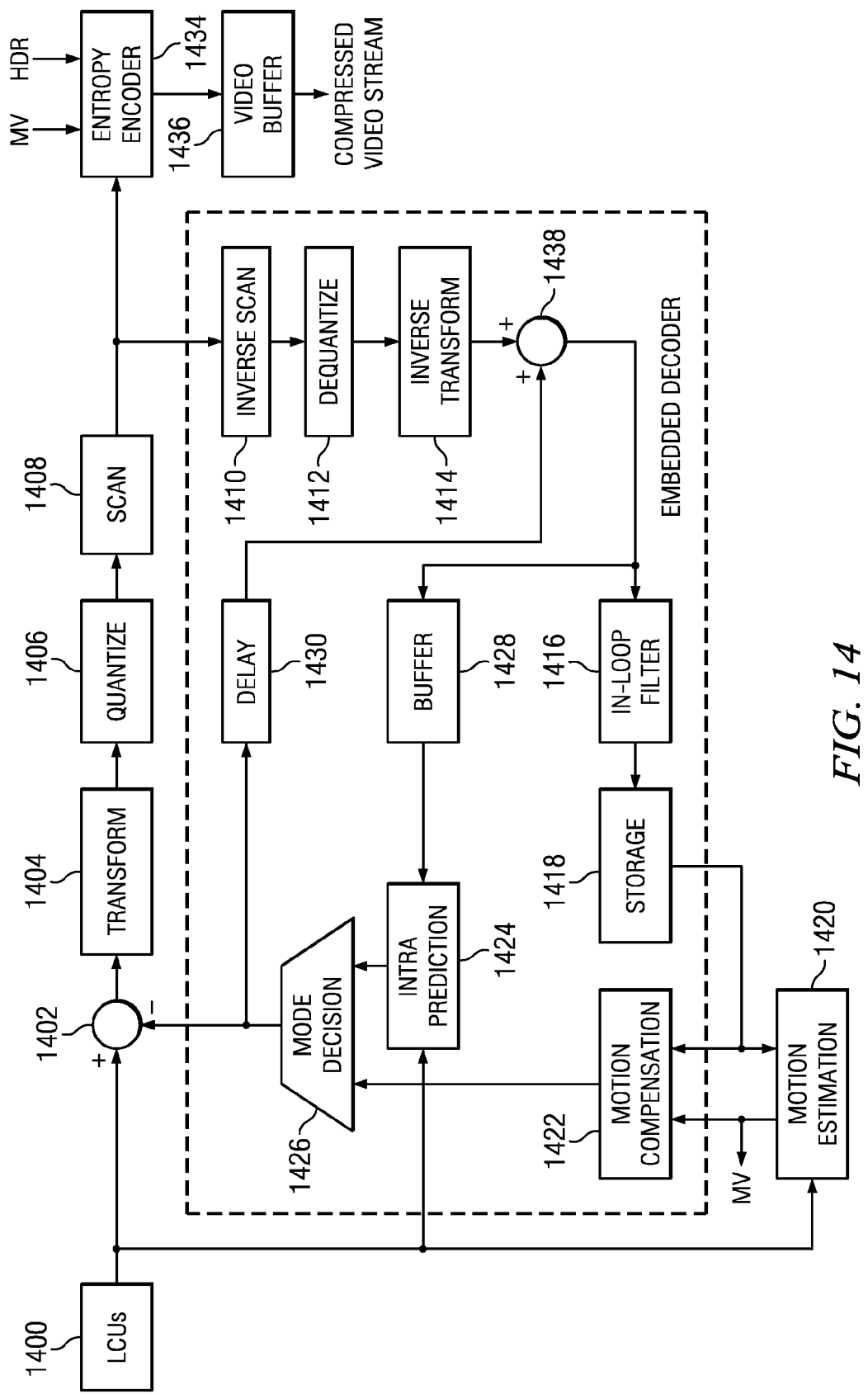
FIG. 14 is a block diagram of a video encoder.

FIG. 14 shows a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU processing receives LCUs of the input video sequence from the coding control component and encodes the LCUs under the control of the coding control component to generate the compressed video stream. The LCUs in each picture are processed in row order. The CUs in the CU structure of an LCU may be processed by the LCU processing in a depth-first Z-scan order. The LCUs 1400 from the coding control unit are provided as one input of a motion estimation component 1420, as one input of an intra-prediction component 1424, and to a positive input of a combiner 1402 (e.g., adder or subtractor or the like). Further, although not specifically shown, the prediction mode of each picture as selected by the coding control component is provided to a mode selector component and the entropy encoder 1434.

The storage component 1418 provides reference data to the motion estimation component 1420 and to the motion compensation component 1422. The reference data may include one or more previously encoded and decoded pictures, i.e., reference pictures.

The motion estimation component 1420 provides motion data information to the motion compensation component 1422 and the entropy encoder 1434. More specifically, the motion estimation component 1420 performs tests on CUs in an LCU based on multiple inter-prediction modes (e.g., skip mode, merge mode, and normal or direct inter-prediction), PU sizes, and TU sizes using reference picture data from storage 1418 to choose the best CU partitioning, PU/TU partitioning, inter-prediction modes, motion vectors, etc. based on a rate distortion coding cost. To perform the tests, the motion estimation component 1420 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU.

The motion estimation component 1420 provides the motion vector (MV) or vectors and the prediction mode for each PU in the selected CU partitioning to the motion compensation component 1422 and the selected CU/PU/TU partitioning with corresponding motion vector(s), reference picture index (indices), and prediction direction(s) (if any) to the entropy encoder 1434.

The motion compensation component provides motion compensated inter-prediction information to the mode decision component 1426 that includes motion compensated inter-predicted PUs, the selected inter-prediction modes for the inter-predicted PUs, and corresponding TU sizes for the selected CU partitioning. The coding costs of the inter-predicted CUs are also provided to the mode decision component 1426.

The intra-prediction component 1424 provides intra-prediction information to the mode decision component 1426 and the entropy encoder 1434. More specifically, the intra-prediction component 1424 performs intra-prediction in which tests on CUs in an LCU based on multiple intra-prediction modes, PU sizes, and TU sizes are performed using reconstructed data from previously encoded neighboring CUs stored in the buffer 1428 to choose the best CU partitioning, PU/TU partitioning, and intra-prediction modes based on a rate distortion coding cost. To perform the tests, the intra-prediction component 1424 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction information provided to the mode decision component includes the intra-predicted PUs, the selected intra-prediction modes for the PUs, and the corresponding TU sizes for the selected CU partitioning. The coding costs of the intra-predicted CUs are also provided to the mode decision component 1426. The intra-prediction information provided to the entropy encoder 1434 includes the selected CU/PU/TU partitioning with corresponding intra-prediction modes.

The mode decision component 1426 selects between intra-prediction of a CU and inter-prediction of a CU based on the intra-prediction coding cost of the CU from the intra-prediction component 1424, the inter-prediction coding cost of the CU from the inter-prediction component 1420, and the picture prediction mode provided by the mode selector component. Based on the decision as to whether a CU is to be intra- or inter-coded, the intra-predicted PUs or inter-predicted PUs are selected, accordingly.

The output of the mode decision component 1426, i.e., the predicted PUs, are provided to a negative input of the combiner 1402 and to a delay component 1430. The associated transform unit size is also provided to the transform component 1404. The output of the delay component 1430 is provided to another combiner (i.e., an adder) 1438. The combiner 1402 subtracts each predicted PU from the original PU to provide residual PUs to the transform component 1404. Each resulting residual PU is a set of pixel difference values that quantify differences between pixel values of the original PU and the predicted PU. The residual blocks of all the PUs of a CU form a residual CU block for the transform component 1404.

The transform component 1404 performs block transforms on the residual CU to convert the residual pixel values to transform coefficients and provides the transform coefficients to a quantize component 1406. More specifically, the transform component 1404 receives the transform unit sizes for the residual CU and applies transforms of the specified sizes to the CU to generate transform coefficients.

The quantize component 1406 quantizes the transform coefficients based on quantization parameters (QPs) and quantization matrices provided by the coding control component and the transform sizes. The quantized transform coefficients are taken out of their scan ordering by a scan component 1408 and arranged sequentially for entropy coding. In essence, the coefficients are scanned backward in highest to lowest frequency order until a coefficient with a non-zero value is located. Once the first coefficient with a non-zero value is located, that coefficient and all remaining coefficient values following the coefficient in the highest to lowest frequency scan order are serialized and passed to the entropy encoder 1434.

The entropy encoder 1434 entropy encodes the relevant data, i.e., syntax elements, output by the various encoding components and the coding control component to generate the compressed video bit stream. The syntax elements are encoded according to the syntactical order specified in HEVC. This syntactical order specifies the order in which syntax elements should occur in a compressed video bit stream. Among the syntax elements that are encoded are flags indicating the CU/PU/TU partitioning of an LCU, the prediction modes for the CUs, and the ordered quantized transform coefficients for the CUs. The entropy encoder 1434 provides the compressed bit stream to a video buffer 1436 for transmission or storage.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a CU provided via the scan component 1408 are returned to their original post-transform arrangement by an inverse scan component 1410, the output of which is provided to a dequantize component 1412, which outputs a reconstructed version of the transform result from the transform component 1404.

The dequantized transform coefficients are provided to the inverse transform component 1414, which outputs estimated residual information representing a reconstructed version of a residual CU. The inverse transform component 1414 receives the transform unit size used to generate the transform coefficients and applies inverse transform(s) of the specified size to the transform coefficients to reconstruct the residual values.

The reconstructed residual CU is provided to the combiner 1438. The combiner 1438 adds the delayed selected CU to the reconstructed residual CU to generate a reconstructed CU, which becomes part of reconstructed picture data. The reconstructed picture data is stored in a buffer 1428 for use by the intra-prediction component 1424 and is provided to a in-loop filter component 1416.

The in-loop filter component 1416 applies various filters to the reconstructed picture data to improve the quality of the reference picture data used for encoding/decoding of subsequent pictures. The filters include a deblocking filter, a sample adaptive offset filter (SAO), and an adaptive loop filter (ALF). The in-loop filter component 1416 may apply the various filters, for example, on an LCU-by-LCU basis. The three filters are applied sequentially. First, the deblocking filter is applied to the reconstructed data. Then the SAO is applied to the deblocked reconstructed picture data, and the ALF is applied to the SAO filtered picture data. The operation of the deblocking filter portion of the in-loop filter component 1416 is described in more detail in reference to the method of FIG. 16. The final reference picture data is provided to storage component 1418.

There are three main in-loop filters defined by the emerging HEVC standard: a deblocking filter, a sample adaptive offset filter (SAO), and an adaptive loop filter (ALF). These filters may be applied sequentially, and, depending on the configuration, the SAO and ALF loop filters may be applied to the output of the deblocking filter.

Figure 15:
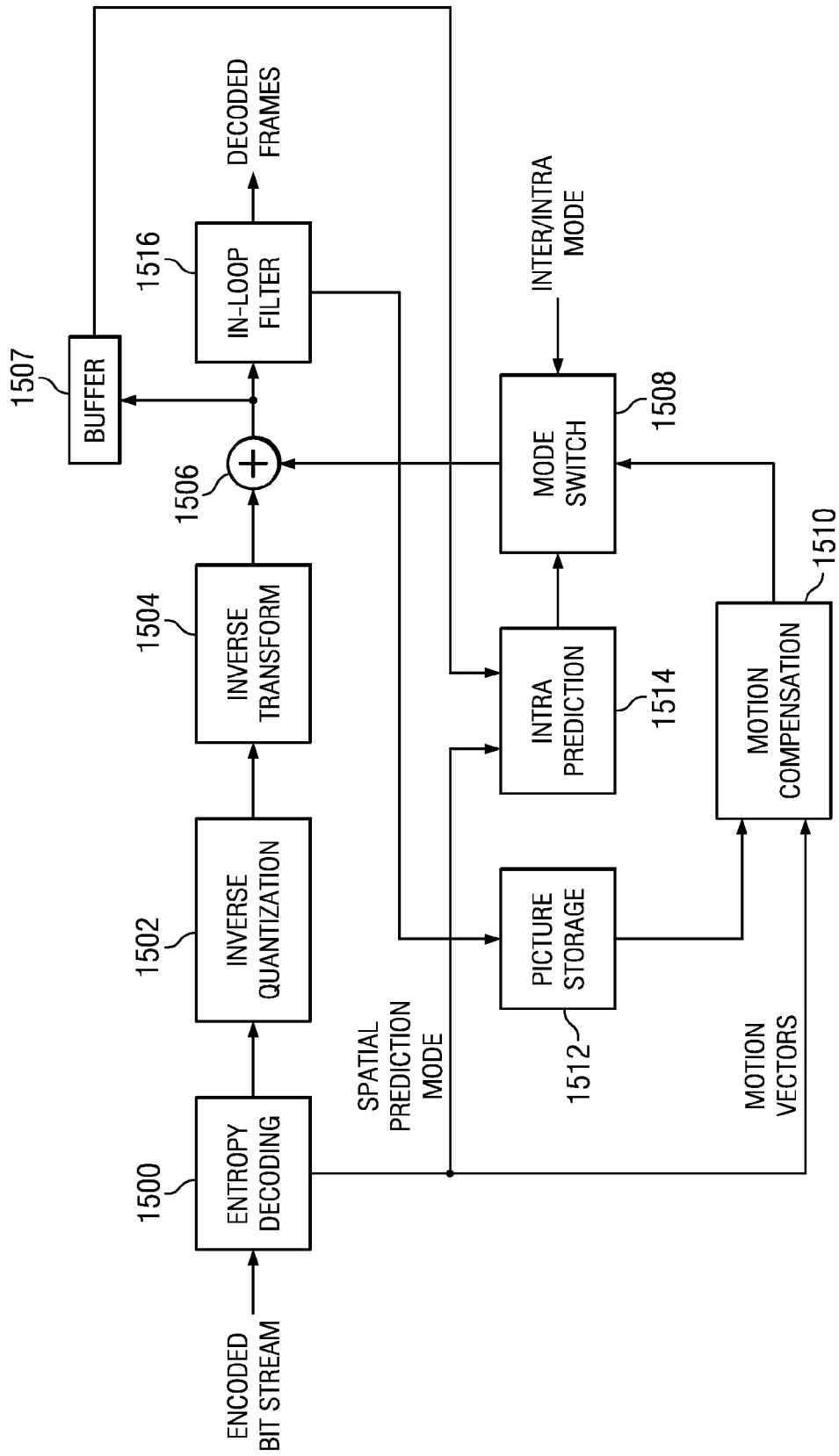
FIG. 15 is a block diagram of a video decoder.

FIG. 15 shows a block diagram of an example video decoder. The video decoder operates to reverse the encoding operations, i.e., entropy coding, quantization, transformation, and prediction, performed by the video encoder of FIG. 14 to regenerate the pictures of the original video sequence. In view of the above description of a video encoder, one of ordinary skill in the art will understand the functionality of components of the video decoder without detailed explanation.

The entropy decoding component 1500 receives an entropy encoded (compressed) video bit stream and reverses the entropy coding to recover the encoded PUs and header information such as the prediction modes and the encoded CU and PU structures of the LCUs. If the decoded prediction mode is an inter-prediction mode, the entropy decoder 1500 then reconstructs the motion vector(s) as needed and provides the motion vector(s) to the motion compensation component 1510.

The inverse quantization component 1502 de-quantizes the quantized transform coefficients of the residual CU. The inverse transform component 1504 transforms the frequency domain data from the inverse quantization component 1502 back to the residual CU. That is, the inverse transform component 1504 applies an inverse unit transform, i.e., the inverse of the unit transform used for encoding, to the de-quantized residual coefficients to produce the residual CUs.

A residual CU supplies one input of the addition component 1506. The other input of the addition component 1506 comes from the mode switch 1508. When an inter-prediction mode is signaled in the encoded video stream, the mode switch 1508 selects predicted PUs from the motion compensation component 1510 and when an intra-prediction mode is signaled, the mode switch selects predicted PUs from the intra-prediction component 1514.

The motion compensation component 1510 receives reference data from storage 1512 and applies the motion compensation computed by the encoder and transmitted in the encoded video bit stream to the reference data to generate a predicted PU. That is, the motion compensation component 1510 uses the motion vector(s) from the entropy decoder 1500 and the reference data to generate a predicted PU.

The intra-prediction component 1514 receives reconstructed samples from previously reconstructed PUs of a current picture from the buffer 1507 and performs the intra-prediction computed by the encoder as signaled by an intra-prediction mode transmitted in the encoded video bit stream using the reconstructed samples as needed to generate a predicted PU.

The addition component 1506 generates a reconstructed CU by adding the predicted PUs selected by the mode switch 1508 and the residual CU. The output of the addition component 1506, i.e., the reconstructed CUs, supplies the input of the in-loop filter component 1516 and is also stored in the buffer 1507 for use by the intra-prediction component 1514.

The in-loop filter component 1516 applies the same filters to the reconstructed picture data as the encoder, i.e., a deblocking filter, an SAO, and an ALF, to improve the quality of the reconstructed picture data. The operation of the deblocking filter portion of the in-loop filter component 1416 is described in more detail in reference to the method of FIG. 16. The output of the in-loop filter component 1516 is the decoded pictures of the video bit stream. Further, the output of the in-loop filter component 1516 is stored in storage 1512 to be used as reference data by the motion compensation component 1510.

Figure 16:
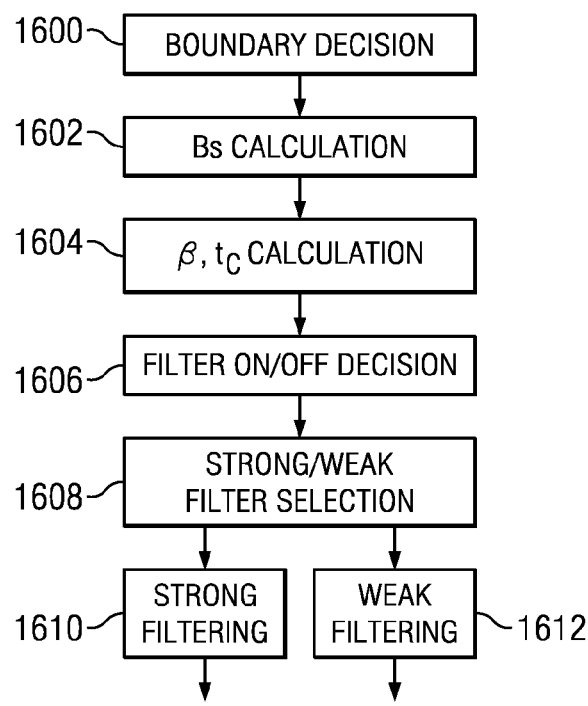
FIG. 16 is a flow diagram of a method for deblocking filtering.

FIG. 16 is a flow diagram of a method for deblocking filtering of luma blocks that may be used in an encoder or a decoder. The method may be performed on a CU by CU basis, an LCU by LCU basis, or a picture by picture basis. For simplicity of explanation, LCU by LCU processing is assumed. The method assumes that the samples of a reconstructed LCU are divided into non-overlapping 8×8 sample blocks. Further, the method is performed on individual filtering sub-blocks of non-overlapping 8×8 filtering blocks that are offset by four luma samples from the 8×8 sample blocks and can be deblocked in parallel.

In some embodiments, the method is applied to vertical boundaries before it is applied to horizontal boundaries. Thus, the samples used when processing vertical boundaries are the original reconstructed samples and the samples used when processing horizontal boundaries may include both original reconstructed samples and intermediately de-blocked samples that were filtered when the deblocking filter processed vertical boundaries. Further, the method is performed on the filtering sub-blocks of a filtering block that cover vertical boundary segments, i.e., the 8×4 filtering sub-blocks (see, for example, FIGS. 7 and 10) before it is performed on the filtering sub-blocks that cover horizontal boundary segments, i.e., the 4×8 filtering sub-blocks (see, for example, FIGS. 8 and 11).

As shown in FIG. 16, initially a boundary decision 1600 is made for the boundary segment covered by the filtering sub-block being processed. The boundary decision determines whether or not the boundary segment is a segment of a TU boundary or a PU boundary. The determination may be made in any suitable way. If the boundary segment is not a segment of a TU boundary or a PU boundary, the boundary segment is not a candidate for deblock filtering and the method terminates.

If the boundary segment is a segment of a TU boundary or a PU boundary, then a boundary strength Bs is calculated for the boundary segment. The boundary strength is represented as an integer with three possible values: 0, 1 and 2. The boundary strength Bs for the boundary segment may be determined as per the pseudo code of Table 1. In this pseudo code, p and q are the neighboring luma blocks on either side of the boundary segment. If the boundary strength Bs for the boundary segment is greater than 0, i.e., has a value of 1 or 2, then the boundary segment is a candidate for deblock filtering. Otherwise, the method terminates.

TABLE 1 if block p or q is intra-coded, Bs = 2
else if block p or q is in a TU containing non-zero
    coefficients, Bs = 1

TABLE 1-continued else if block p and q have different reference
    pictures or different number of MVs, Bs = 1
else if block p and q have a single MV, and
    vertical or horizontal MV difference ≥ 4, Bs = 1
else if block p and q have 2 MVs, and at least
    one MV has vertical/horizontal MV difference ≥ 4, Bs = 1
else Bs = 0

Two threshold values, $\beta$ and $t_C$, are also determined 1604. As previously mentioned, the blocking artifact strength depends to a large extent on the values of the quantization parameters (QPs) used on the sample blocks at the boundary segment. Accordingly, these QP values are taken into account in the remaining deblocking filter decisions through the use of these two thresholds. Any suitable technique for determining appropriate values of $\beta$ and $t_C$ may be used. In some embodiments, to determine $\beta$ and $t_C$, the QP values of the two blocks are combined, e.g., $$Q=((QP_P+QP_Q+1)>>1)$$

where P and Q are the sample blocks on each side of the boundary segment and the result, Q, is used to look up values for $\beta$ and $t_C$ in a table defined by the coding standard, e.g., HEVC. Table 2 is an example of such a table. The value of Q is clipped to range of [0:51] and used to locate the appropriate value for $\beta$ in the table and, if the boundary strength Bs=1, the value of Q is clipped to range of [0:53] and used to locate the appropriate value for tc in the table. If the boundary strength Bs=2, the value of Q+2 is clipped to range of [0:53] and used to locate the appropriate value for tc in the table. In some embodiments, offsets may be added to the value of Q before the clipping.

TABLE 2

| | Q | | | | | | | | | | | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 |
| $\beta$ | 0 | 0 | 0 | 0 | 0 | 0 | 0 | 0 | 0 | 0 | 0 | 0 | 0 | 0 | 0 | 0 | 6 | 7 | 8 |
| $t_c$ | 0 | 0 | 0 | 0 | 0 | 0 | 0 | 0 | 0 | 0 | 0 | 0 | 0 | 0 | 0 | 0 | 0 | 0 | 1 |
| | Q | | | | | | | | | | | | | | | | | | |
| | 19 | 20 | 21 | 22 | 23 | 24 | 25 | 26 | 27 | 28 | 29 | 30 | 31 | 32 | 33 | 34 | 35 | 36 | 37 |
| $\beta$ | 9 | 10 | 11 | 12 | 13 | 14 | 15 | 16 | 17 | 18 | 20 | 22 | 24 | 26 | 28 | 30 | 32 | 34 | 36 |
| $t_c$ | 1 | 1 | 1 | 1 | 1 | 1 | 1 | 1 | 1 | 2 | 2 | 2 | 2 | 3 | 3 | 3 | 3 | 4 | 4 |
| | Q | | | | | | | | | | | | | | | | | | |
| | 38 | 39 | 40 | 41 | 42 | 43 | 44 | 45 | 46 | 47 | 48 | 49 | 50 | 51 | 52 | 53 | | | |
| $\beta$ | 38 | 40 | 42 | 44 | 46 | 48 | 50 | 52 | 54 | 56 | 58 | 60 | 62 | 64 | — | — | | | |
| $t_c$ | 5 | 5 | 6 | 6 | 7 | 8 | 9 | 10 | 11 | 13 | 14 | 16 | 18 | 20 | 22 | 24 | | | |

The filter on/off decision is then made 1606, i.e., a determination is made as to whether or not to apply a deblocking filter to the boundary segment. To make this decision, a measure of the deviation d along the boundary segment is computed and compared to the threshold $\beta$. If d<$\beta$, then filtering is turned on; otherwise, the method terminates. The deviation d may be computed using any suitable combination of two rows (for a top or bottom filtering sub-block) or two columns (for a left or right filtering sub-block) in the filtering sub-block. Eqs. 3, 4, 5, and 6 are examples of how the deviation d may be computed for two combinations of two rows or columns.

If filtering is turned on, the strong/weak filter selection 1608 is performed, and a filter of the selected strength 1610, 1612 is applied at the boundary segment. The strong and weak filtering operations are defined by the coding standard, e.g., HEVC. In general, the strong filter modifies three samples on each side of the boundary segment and the weak filter modifies one or two pixels on each side of the boundary segment. Examples of such filters may be found in WD4, WD5, HEVC Draft 6, HEVC Draft 7, and HEVC Draft 8.

In some embodiments, the filter strength decision is made for each row (for a top or bottom filtering sub-block) or column (for a left or right filtering sub-block) of the filtering sub-block as per Eq. 7 and a deblocking filter of the selected strength is applied to each row or column. In some embodiments, the decision is made jointly for all four rows or columns in the filtering sub-block. For example, if the outer two rows or columns of a filtering sub-block are used for the filter on/off decision, then the outer two rows or columns are also used for the joint strong/weak filter decision. Similarly, if the inner two rows or columns of a filtering sub-block are used for the filter on/off decision, then the inner two rows or columns are also used for the joint strong/weak filter decision. Eqs. 8 and 9 are examples of how the filter strength decision may be computed using two rows or columns.

The above embodiments are described for luma samples. In HEVC, for application of the deblock filter to chroma samples in 4:2:0 chroma format, i.e., the chroma samples are a quarter of the resolution of the luma samples, non-overlapping 4×4 chroma filtering blocks corresponding to the 8×8 luma filtering blocks are offset by two chroma samples because a four tap filter is used for chroma deblocking, which requires two chroma samples on each side of a boundary. In addition, the chroma filtering blocks inherit the filter on/off decision from corresponding luma filtering blocks. Consequently, fully parallel processing of the chroma filtering blocks is also possible.

Figure 17:
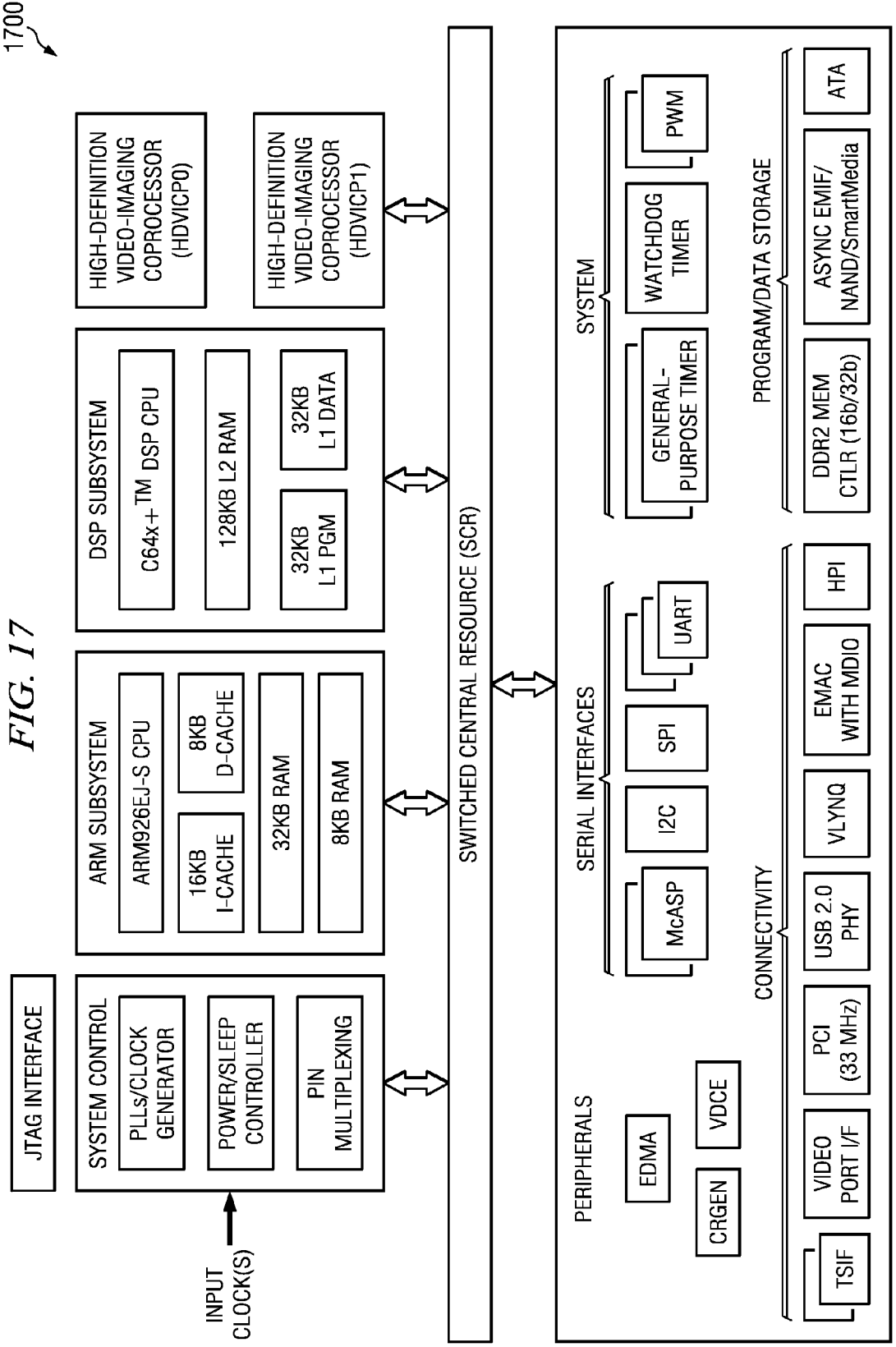
FIG. 17 is a block diagram of an illustrative digital system.

FIG. 17 is a block diagram of an example digital system suitable for use as an embedded system that may be configured to perform deblocking filtering as described herein during encoding of a video stream or decoding of an encoded video bit stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1700 is a programmable platform designed to meet the processing needs of applications such as video encode/decode/transcode/transrate, video surveillance, video conferencing, set-top box, medical imaging, media server, gaming, digital signage, etc. The SoC 1700 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1700 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 1700, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1700 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 17, the SoC 1700 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 1700 may be configured to perform deblocking filtering during video encoding or decoding using methods described herein. For example, the coding control of the video encoder of FIG. 14 may be executed on the DSP subsystem or the ARM subsystem and at least some of the computational operations of the block processing, including the intra-prediction and inter-prediction of mode selection, transformation, quantization, and entropy encoding may be executed on the HDVICP coprocessors. At least some of the computational operations of the deblocking filtering may also be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, in embodiments described herein, the filter on/off decision is made jointly for all four rows or columns of a filtering sub-block. One of ordinary skill in the art will understand embodiments in which the filter on/off decision is made individually for each row or each column of a filtering sub-block, or jointly for two pairs of adjacent rows or adjacent columns. Put more generally, in various embodiments, the filter on/off decision may be made for every N rows or columns of a filtering sub-block, N=1, 2, or 4.

In another example, in embodiments described herein, the strong/weak filter decision is made jointly for all four rows or columns of a filtering sub-block or is made individually for each row or column of a filtering sub-block. One of ordinary skill in the art will understand embodiments in which the strong/weak filter decision is made jointly for two pairs of adjacent rows or adjacent columns. Put more generally, in various embodiments, the strong/weak filter decision may be made for every M rows or columns of a filtering sub-block, M=1, 2, or 4.

Further, one of ordinary skill in the art will appreciate that any number of N rows or columns may be used for the on/off filter decision in combination with the use of any number of M rows or columns for the on/off filter decision, N, M=1, 2, or 4. For example, the filter on/off decision may be made jointly for two pairs of rows or columns (N=2) and the strong/weak filter decision may be made individually for each row or column (M=1).

In another example, although some embodiments have been described in which vertical boundaries are deblock filtered before horizontal boundaries, one of ordinary skill in the art will understand embodiments in which horizontal boundaries are deblock filtered before vertical boundaries.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method for deblocking filtering a reconstructed picture in a video encoder or a video decoder, the method comprising:
   computing a first measure of deviation at a first four sample boundary segment covered by a first filtering sub-block of an 8×8 filtering block, wherein the first measure of deviation is computed using only samples of the reconstructed picture in the first filtering sub-block;
   using the first measure of deviation in deblocking filter decisions for the first four sample boundary segment;
   computing a second measure of deviation at a second four sample boundary segment covered by a second filtering sub-block of the 8×8 filtering block, wherein the second measure of deviation is computed using only samples of the reconstructed picture in the second filtering sub-block; and
   using the second measure of deviation in deblocking filter decisions for the second four sample boundary segment,
   wherein the first filtering sub-block is a top 8×4 filtering sub-block, the second filtering sub-block is a bottom 8×4 filtering sub-block, and the first and second four sample boundary segments are vertical boundary segments, or the first filtering sub-block is a left 4×8 filtering sub-block, the second filtering sub-block is a right 4×8 filtering sub-block, and the first and second four sample boundary segments are horizontal boundary segments, and wherein computing the first measure of deviation comprises computing the first measure of deviation using samples from a first row of the first filtering sub-block and a second row of the first filtering sub-block when the first filtering sub-block is the top 8×4 filtering sub-block; and computing the first measure of deviation using samples from a first column of the first filtering sub-block and a second column of the first filtering sub-block when the first filtering sub-block is the left 4×8 filtering sub-block.

2. The method of claim 1, wherein using the first measure of deviation in deblocking filter decisions comprises:
   making a filter on/off decision jointly for all rows of the first filtering sub-block using the first measure of deviation when the first filtering sub-block is the top 8×4 filtering sub-block; and
   making a filter on/off decision jointly for all columns of the first filtering sub-block based on the first measure of deviation when the first filtering sub-block is the left 4×8 filtering sub-block.

3. The method of claim 1, wherein using the first measure of deviation in deblocking filter decisions comprises:
   making a strong/weak filter decision jointly for all rows of the first filtering sub-block using the first measure of deviation when the first filtering sub-block is the top 8×4 filtering sub-block; and
   making a strong/weak filter decision jointly for all columns of the first filtering sub-block using the first measure of deviation when the first filtering sub-block is the left 4×8 filtering sub-block.

4. The method of claim 1, further comprising:
   computing a first boundary strength for the first four sample boundary segment; and
   computing a second boundary strength for the second four sample boundary segment.

5. The method of claim 1, further comprising:
   determining values for first deblocking filter thresholds β and tc for the first filtering sub-block;
   using the first deblocking filter thresholds β and tc in deblocking filter decisions for the first boundary segment;
   determining values for second deblocking filter thresholds β and tc for the second filtering sub-block; and
   using the second deblocking filter thresholds β and tc in deblocking filter decisions for the second boundary segment.

6. A non-transitory computer readable medium comprising instructions that, when executed in a digital system, cause the digital system to:
   compute a first measure of deviation at a first four sample boundary segment covered by a first filtering sub-block of an 8×8 filtering block, wherein the first measure of deviation is computed using only samples of a reconstructed picture in the first filtering sub-block;
   use the first measure of deviation in deblocking filter decisions for the four sample first boundary segment;
   compute a second measure of deviation at a second four sample boundary segment covered by a second filtering sub-block of the 8×8 filtering block, wherein the second measure of deviation is computed using only samples of the reconstructed picture in the second filtering sub-block; and use the second measure of deviation in deblocking filter decisions for the second four sample boundary segment, wherein the first filtering sub-block is a top 8×4 filtering sub-block, the second filtering sub-block is a bottom 8×4 filtering sub-block, and the first and second four sample boundary segments are vertical boundary segments, or the first filtering sub-block is a left 4×8 filtering sub-block, the second filtering sub-block is a right 4×8 filtering sub-block, and the first and second four sample boundary segments are horizontal boundary segments, and wherein computing the first measure of deviation comprises computing the first measure of deviation using samples from a first row of the first filtering sub-block and a second row of the first filtering sub-block when the first filtering sub-block is the top 8×4 filtering sub-block; and computing the first measure of deviation using samples from a first column of the first filtering sub-block and a second column of the first filtering sub-block when the first filtering sub-block is the left 4×8 filtering sub-block.

7. The non-transitory computer readable medium of claim 6, wherein the instructions that cause the digital system to use the first measure of deviation in deblocking filter decisions include instructions that cause the digital system to:

make a filter on/off decision jointly for all rows of the first filtering sub-block using the first measure of deviation when the first filtering sub-block is the top 8×4 filtering sub-block; and make a filter on/off decision jointly for all columns of the first filtering sub-block based on the first measure of deviation when the first filtering sub-block is the left 4×8 filtering sub-block.

8. The non-transitory computer readable medium of claim 6, wherein the instructions that cause the digital system to use the first measure of deviation in deblocking filter decisions include instructions that cause the digital system to:

make a strong/weak filter decision jointly for all rows of the first filtering sub-block using the first measure of deviation when the first filtering sub-block is the top 8×4 filtering sub-block; and make a strong/weak filter decision jointly for all columns of the first filtering sub-block using the first measure of deviation when the first filtering sub-block is the left 4×8 filtering sub-block.

9. The non-transitory computer readable medium of claim 6, wherein the instructions further cause the digital system to:

compute a first boundary strength for the first four sample boundary segment; and compute a second boundary strength for the second four sample boundary segment.

10. The non-transitory computer readable medium of claim 6, wherein the instructions further cause the digital system to:

determine values for first deblocking filter thresholds $\beta$ and tc for the first filtering sub-block;

use the first deblocking filter thresholds $\beta$ and tc in deblocking filter decisions for the first boundary segment;

determine values for second deblocking filter thresholds $\beta$ and tc for the second filtering sub-block; and use the second deblocking filter thresholds $\beta$ and tc in deblocking filter decisions for the second boundary segment.

\* \* \* \* \*